US009456170B1

(12) United States Patent
Miller et al.

(10) Patent No.: US 9,456,170 B1
(45) Date of Patent: Sep. 27, 2016

(54) AUTOMATED CAPTION POSITIONING SYSTEMS AND METHODS

(71) Applicant: 3PLAY MEDIA, INC., Boston, MA (US)

(72) Inventors: Joshua Miller, Charlestown, MA (US); Anatole Khesin, Somerville, MA (US); Christopher E. Johnson, Belmont, MA (US); Roger S. Zimmerman, Wellesley, MA (US); Christopher S. Antunes, Somerville, MA (US); Jeremy E. Barron, Boston, MA (US); Andrew H. Schwartz, Jamaica Plain, MA (US)

(73) Assignee: 3Play Media, Inc., Boston, MA (US)

( * ) Notice: Subject to any disclaimer, the term of this patent is extended or adjusted under 35 U.S.C. 154(b) by 0 days.

(21) Appl. No.: 14/508,866

(22) Filed: Oct. 7, 2014

Related U.S. Application Data

(60) Provisional application No. 61/888,358, filed on Oct. 8, 2013.

(51) Int. Cl.
| | | |
|---|---|---|
| H04N 7/00 | (2011.01) | |
| H04N 11/00 | (2006.01) | |
| H04N 5/445 | (2011.01) | |
| G06K 9/72 | (2006.01) | |

(52) U.S. Cl.
CPC ............ *H04N 5/44591* (2013.01); *G06K 9/72* (2013.01)

(58) Field of Classification Search
CPC .. H04N 21/4884; H04N 5/445; H04N 5/278; H04N 13/007; H04N 7/0885
USPC ........................................ 348/468
See application file for complete search history.

(56) References Cited

U.S. PATENT DOCUMENTS

| | | | | |
|---|---|---|---|---|
| 5,298,995 A * | 3/1994 | Monta | ..................... | H04N 5/278 348/458 |
| 5,477,274 A * | 12/1995 | Akiyoshi | ........... | H04N 5/44513 348/468 |
| 5,508,754 A * | 4/1996 | Orphan | ................ | H04M 11/085 348/461 |
| 5,537,151 A * | 7/1996 | Orr | ..................... | H04N 5/44513 348/468 |
| 5,721,940 A | 2/1998 | Luther et al. | | |
| 6,097,442 A * | 8/2000 | Rumreich | .......... | H04N 5/44513 348/563 |
| 6,172,675 B1 | 1/2001 | Ahmad et al. | | |
| 6,243,419 B1 | 6/2001 | Satou et al. | | |
| 6,363,380 B1 | 3/2002 | Dimitrova | | |
| 6,473,778 B1 | 10/2002 | Gibbon | | |
| 6,505,153 B1 | 1/2003 | Van Thong et al. | | |
| 6,580,437 B1 | 6/2003 | Liou et al. | | |
| 6,710,811 B1 | 3/2004 | Lin et al. | | |
| 7,006,881 B1 * | 2/2006 | Hoffberg | ................ | G05B 15/02 700/17 |
| 7,165,264 B1 * | 1/2007 | Westrick | ................. | G06F 17/26 345/470 |
| 7,206,029 B2 * | 4/2007 | Cohen-Solal | ............ | H04N 5/45 345/629 |
| 7,346,489 B1 | 3/2008 | Bever et al. | | |
| 7,661,121 B2 | 2/2010 | Smith et al. | | |
| 2002/0075403 A1 | 6/2002 | Barone et al. | | |
| 2002/0122136 A1 * | 9/2002 | Safadi | ..................... | H04N 5/445 348/465 |

(Continued)

*Primary Examiner* — Michael Lee
(74) *Attorney, Agent, or Firm* — Finch & Maloney PLLC

(57) ABSTRACT

In at least one embodiment, a system for positioning captions upon video images of a media file is provided. The system includes a memory storing at least one caption frame associated with at least one video frame, at least one processor in data communication with the memory, and a caption engine component executable by the at least one processor. The caption engine component is configured to determine that at least one region of the at least one video frame is free of identified content and position the at least one caption frame within the at least one region.

20 Claims, 27 Drawing Sheets

(56) References Cited

U.S. PATENT DOCUMENTS

| | | | |
|---|---|---|---|
| 2002/0140862 A1* | 10/2002 | Dimitrova | H04N 5/45 348/565 |
| 2003/0169366 A1* | 9/2003 | Lenzi | H04N 5/278 348/461 |
| 2003/0189669 A1* | 10/2003 | Bowser | H04N 5/445 348/564 |
| 2003/0190148 A1 | 10/2003 | Lee | |
| 2004/0125877 A1 | 7/2004 | Chang et al. | |
| 2004/0170392 A1 | 9/2004 | Lu et al. | |
| 2004/0255249 A1 | 12/2004 | Chang et al. | |
| 2007/0033515 A1 | 2/2007 | Sull et al. | |
| 2007/0118801 A1 | 5/2007 | Harshbarger et al. | |
| 2007/0253680 A1* | 11/2007 | Mizote | H04N 5/44504 386/230 |
| 2008/0276159 A1 | 11/2008 | Narayanaswami et al. | |
| 2009/0273711 A1* | 11/2009 | Chapdelaine | G06K 9/00711 348/465 |
| 2010/0257444 A1 | 10/2010 | Bever et al. | |
| 2011/0022394 A1 | 1/2011 | Wide | |
| 2012/0281139 A1* | 11/2012 | Zhang | G06T 3/40 348/468 |
| 2012/0293712 A1* | 11/2012 | Mountain | H04N 5/44513 348/468 |
| 2012/0304062 A1 | 11/2012 | Schultz et al. | |
| 2013/0011121 A1 | 1/2013 | Forsyth et al. | |

\* cited by examiner

FIG. 23

AUTOMATED CAPTION POSITIONING SYSTEMS AND METHODS

RELATED APPLICATIONS

The present application claims priority under 35 U.S.C. §119(e) to U.S. Provisional Application 61/888,358, titled "AUTOMATED CAPTION POSITIONING," filed on Oct. 8, 2013, which is hereby incorporated herein by reference in its entirety. The present application relates to U.S. application Ser. No. 13/246,123 filed on Sep. 27, 2011 and titled "ELECTRONIC TRANSCRIPTION JOB MARKET," ("Electronic Transcription Job Market' application") which is hereby incorporated herein by reference in its entirety. The present application relates to U.S. application Ser. No. 13/426,339 filed on Mar. 21, 2012 and titled "INTELLIGENT CAPTION SYSTEMS AND METHODS," which is hereby incorporated herein by reference in its entirety.

BACKGROUND

1. Technical Field

The technical field relates generally to transcription of content and, more particularly, to systems and methods that automatically manipulate characteristics of captions displayed in association with media files.

2. Background Discussion

Conventional caption placement processes position captions (open or closed) within a default region located at the center and the bottom of video frames. The default region is generally suitable for caption placement because the default region is often free of essential information for the viewer. Therefore, it is often the case that caption text may be superimposed over this default region of the video frames without impairing the viewer's ability to observe and comprehend the information provided in the video frames.

However, there are some video frames that include essential information within the default region. In fact, some FCC regulations proposed under the 21rst Century Video Accessibility Act include standards for placement of captions that address the video frames with essential information in the default region. For example, according to these standards, if a viewer is watching a documentary and there is text in the bottom of the screen that states who the speaker is and what their profession is, closed captioning cannot be placed over this text, as it would obscure the information.

Presently available caption formats support specification of the location of the caption on the video frame. These formats also support specification of the timing of the caption text (which should be synchronized with the speech and sounds which are being captioned), as well as the style of the text (e.g. font, color and size).

SUMMARY

When providing an ongoing caption sequence for video content, it is important that the captions within the sequence be positioned so as not to interfere with other identified content included within the video frames. Examples the other identified content that should not be interfered with include names of speakers (e.g. during an interview or panel discussion); descriptive subtitles for the hearing impaired (e.g. descriptions of off screen sounds and events); textual content of the video scene, such as street signs, character names on office doors, mathematical equations, etc.; copyright notices and legal warnings; information about the media file as a whole (e.g., opening or closing credits); textual information descriptive of the media story or content, such as content describing a scene transition or narrative element of a story (e.g. "1 year later"); text present in the scene depicted, such as a sign, written or printed note or notice, product label, or information in a presentation slide; reference information, including website URLs, titles of works referenced in the video, names of on or off-screen personas or characters, phone numbers, hashtags, dates and timers, and stock tickers; and translations of foreign language content. To prevent interference with content, at least some aspects and embodiments disclosed herein automatically identifying a preferred area or areas on the video frame to place caption text. Some embodiments also implement hybrid approaches where a user interface provides automatically generated caption placement information and receives final position information from a human caption placement expert.

More specifically, at least some embodiments disclosed herein provide for computer systems and computer-implemented methods that automate caption placement within video frames, enhance caption text readability, and increase overall understanding of the video content. For instance, one such system is provided by 3Play Media of Cambridge, Mass. The 3Play Media system accepts media files uploaded by customers who wish to have time-coded transcriptions and, ultimately, captions, produced for each file. The 3Play Media system processes these files using an automatic speech recognition component to create a preliminary time-coded textual transcription of the audio in the media file. In addition, the 3Play Media system provides a transcription editing platform that optimizes correction of automatic speech recognition output to create a high-quality transcription. This platform provides authorized editors with access to the automatic speech recognition drafts and media files associated with the drafts via a 3Play Media server. While the editor remains authorized, the platform processes edits made by the editor to the speech recognition output, including word corrections, format corrections, time-code modifications, and speaker identification. The platform can also store the corrected transcription on the 3Play Media server.

Some embodiments of the 3Play Media system also provide a customer interface configured to receive a request from an authorized customer or editor to automatically position and superimpose caption text upon video frames. In at least one embodiment the 3Play Media system is configured to superimpose caption text upon a default region at the bottom and the center of the video frames, where doing so will not obscure other content with the default region. In this embodiment, the system is further configured to position the caption text so as not to interfere with other content where the other content is present within the default region. Additionally, for readability and comprehension, in some embodiments, the system is configured to not change the position of the captions unnecessarily across video frames.

In other embodiments, the 3Play Media system is configured to place caption text on the side of video frames that corresponds to the character who is speaking during video dialog sequences. This feature is especially useful to assist the hearing impaired in understanding the video content. Further, in some embodiments, the 3Play Media system is configured to place captions on the side of the video frame that corresponds to the direction of an off-screen sound source (e.g., a person speaking or some other sound source). This feature can also aid in the comprehension of the video content.

In at least one embodiment, a system for positioning captions upon video images of a media file is provided. The system includes a memory storing at least one caption frame associated with at least one video frame, at least one processor in data communication with the memory, and a caption engine component executable by the at least one processor. The caption engine component is configured to determine that at least one region of the at least one video frame is free of identified content and position the at least one caption frame within the at least one region.

In the system, the caption engine component may be further configured to generate caption information including a caption based on the at least one caption frame. The identified content may include text present in the video frame. The caption engine may be configured to determine that the at least one region is free of identified content at least in part by executing a text detector component. The text detector component may be configured to limit text searching to the at least one region. The caption engine may be further configured to calculate dimensions of the at least one region based on caption text included in the at least one caption frame. The caption engine may be further configured to determine that a default region of the at least one video frame includes identified content. The caption engine may be further configured to identify a series of consecutive video frames as including the at least one video frame and one or more video frames including identified content within one or more default regions.

In the system, the caption engine may be further configured to calculate a duration of the series, determine that the duration exceeds a threshold value, and position, in response to determining that the duration exceeds the threshold value, one or more caption frames within one or more candidate regions of one or more video frames included in the series, the one or more candidate regions including the at least one region, the one or more caption frames including the at least one caption frame. The caption engine may be further configured to smooth positional transitions between caption frames within a series of consecutive caption frames at least in part by positioning additional caption frames within a region common to the series. The caption engine may be further configured to smooth positional transitions between caption frames within a series of consecutive caption frames at least in part by positioning a plurality of caption frames belonging to a textual unit within a region common to the series.

In the system, the caption engine may be further configured to calculate a percentage of all caption frames associated with the media file that are within the one or more caption frames, compare the percentage to a threshold value, and store an indication that the at least one media file may be a foreign language media file. The caption engine may be configured to determine that the at least one region of the at least one video frame is free of identified content by determining that a confidence value that a default region contains text is greater than a confidence value that the at least one region contains text.

The system may further include a user interface component executable by the at least one processor and configured to receive input to place the at least one caption frame at a new location and position, responsive to receiving the input, the at least one caption at the new location.

In the system, the caption engine may be further configured to analyze audio information associated with the media file to generate an analysis result, determine at least one originating field relative to the video frame based on the analysis result, and move the at least one region to the at least one originating field. The analysis result may be at least one of an inter-channel level difference, an inter-channel time difference, an automatic speech recognition right-channel text output, an automatic speech recognition left-channel text output, and means and variance of audio clusters. The caption engine may be further configured to identify a plurality of source identifiers within caption text of the at least one caption and split the caption frame into a plurality of caption frames respectively corresponding to the plurality of source identifiers.

In another embodiment, a method for positioning captions upon video images of a media file is provided. The method includes acts of determining that at least one region of the at least one video frame is free of identified content and positioning the at least one caption frame within the at least one region. The method may further comprise the act of generating caption information including a caption based on the at least one caption frame.

In another embodiment, a non-transitory computer readable medium is provided. The computer readable medium stores sequences of computer executable instructions for positioning captions upon video images of a media file. The sequences of computer executable instructions including instructions configured to instruct at least one processor to determine that at least one region of the at least one video frame is free of identified content and position the at least one caption frame within the at least one region.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 23 is an illustration of another user interface screen provided by a caption system;

DETAILED DESCRIPTION

Figure 1:
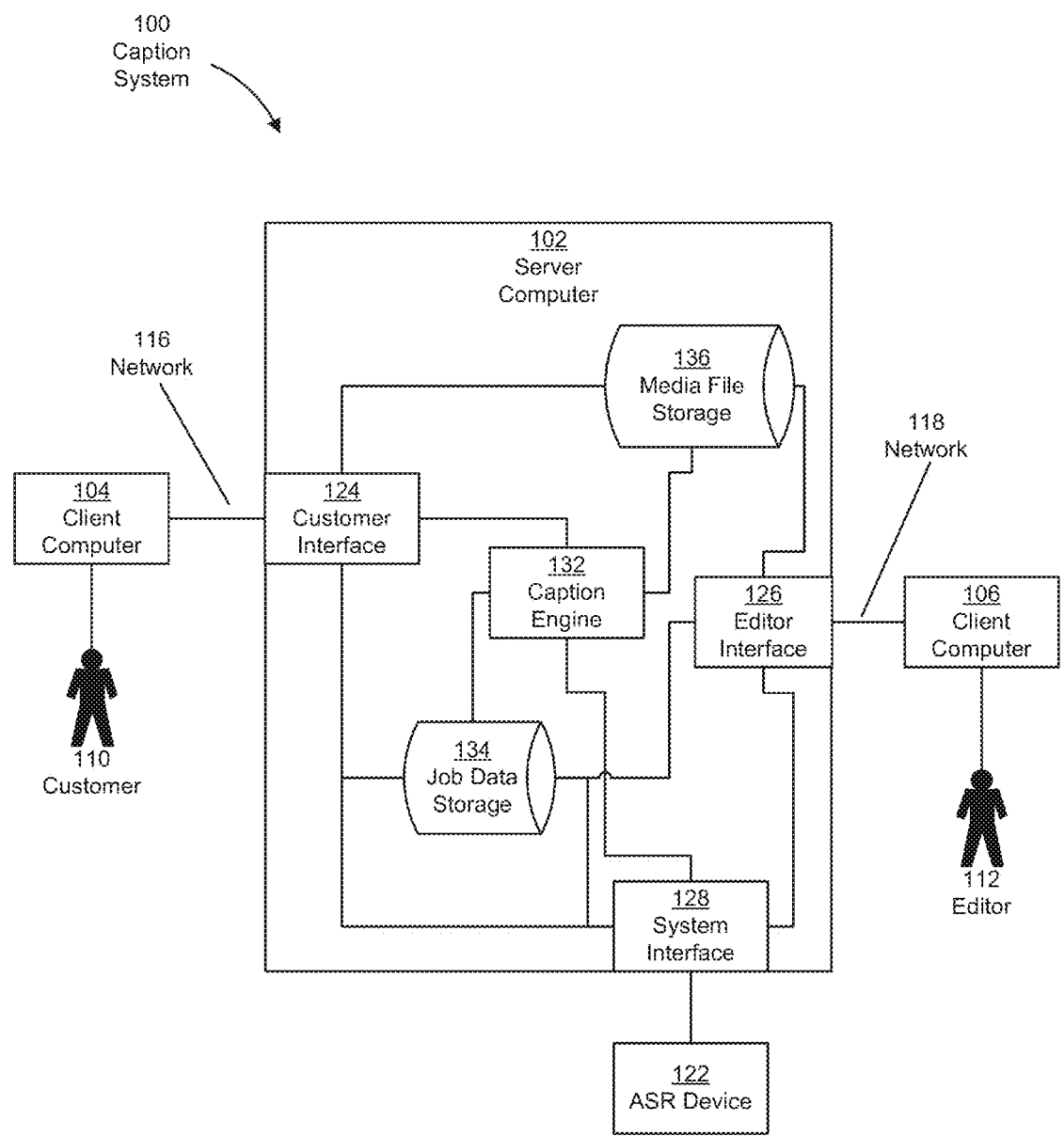
FIG. 1 is a context diagram including an exemplary caption system.

Some embodiments disclosed herein include apparatus and processes for generating and positioning, using a computer system, captions descriptive of content included in media files. Various apparatus and processes included in these embodiments implement a variety of useful features. For example, according to one embodiment, a process executed by a specially configured computer system positions caption frames so that superimposition of caption text within the caption frames during playback of the media file will not obscure other identified content. In another embodiment, a process executed by the computer system automatically smoothes positional transitions between the caption frames over time to prevent jitter that would otherwise inhibit readability of caption text included in the caption frames. In another embodiment, a process executed by a computer system provides a user interface that receives input from a user with expertise in caption placement. The input may indicate positions for caption frames and the process may translate the input into position information for storage within the caption frames.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Caption System

Various embodiments utilize one or more computer systems to implement a caption system that is configured to receive media files from customers and to provide, to the customers, caption information corresponding to transcriptions of the content included in the media files. FIG. 1 illustrates one of these embodiments, a caption system 100. As shown, FIG. 1 includes a server computer 102, client computers 104 and 106, a customer 110, an editor 112, networks 116 and 118, an automatic speech recognition ("ASR") device 122. The server computer 102 includes several components: a customer interface 124, an editor interface 126, a system interface 128, a caption engine 132, job data storage 134, and a media file storage 136.

As shown in FIG. 1, the system interface 128 exchanges (i.e. sends or receives) media file information with the ASR device 122. The customer interface 124 exchanges information with the client computer 104 via the network 116. The editor interface 126 exchanges information with the client computer 106 via the network 118. The networks 116 and 118 may include any communication network through which computer systems may exchange information. For example, the network 116 may be a public network, such as the internet, and may include other public or private networks such as LANs, WANs, extranets and intranets.

Information may flow between the components illustrated in FIG. 1, or any of the elements, components and subsystems disclosed herein, using a variety of techniques. Such techniques include, for example, passing the information over a network using standard protocols, such as TCP/IP or HTTP, passing the information between modules in memory and passing the information by writing to a file, database, data store, or some other non-volatile data storage device. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

In some embodiments illustrated by FIG. 1, the caption system 100 receives media files, and other information, from the customer 110 via the customer interface 124. In these embodiments, the customer interface 124 is configured to provide a user interface to the customer 110 via the network 116 and the client computer 104. For instance, in one embodiment, the customer interface 124 is configured to serve a browser-based user interface to the customer 110 that is rendered by a web-browser running on the client computer 104. In this embodiment, the customer interface 124 exchanges information with the customer 110 via this user interface and stores the exchanged information within the job data storage 134 or the media file storage 136. Examples of information stored in the job data storage 134 include information descriptive of captions, media files, customers, projects, and transcriptions. Information descriptive of captions may include caption formatting instructions specifying exemplary, predefined annotations that are preferred or required for use by editors, such as the editor 112, to mark content within a project or supplied by a customer, such as the customer 110. These predefined annotations may be displayed to the editors via a user interface provided by the editor interface 126. At least one example of this user interface and the editor interface 126 is described in the co-pending "Electronic Transcription Job Market" application. Examples of these predefined annotations include speaker names (to ensure consistent spelling), special speaker titles (e.g., ANNOUNCER, SUBJECT, INTERVIEWER, etc.). Examples of information stored in the media file storage 136 include media files, transcription files, and caption files. Both the job data storage 134 and the media file storage 136 are described further below with reference to FIG. 2.

Information within the caption system 100, including data within the job data storage 134 and the media file storage 136, may be stored in any logical construction capable of holding information on a computer readable medium including, among other structures, file systems, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

In other embodiments, the customer interface 124 is configured to perform a variety of processes in response to exchanging information via the user interface. For instance, in one embodiment, after receiving one or more media files via the user interface, the customer interface 124 provides the caption engine 132 with an identifier of newly stored, unprocessed media files. In other embodiments, after receiving one or more media files via the user interface, the customer interface 124 issues a request for ASR processing to the system interface 128.

In other embodiments, the customer interface 124 is configured to facilitate a caption creation process executed by the customer 110. In executing in this configuration, the customer interface 124 may interact with the caption engine 132, the job data storage 134, the media file storage 136, and the system interface 128. One example of a caption creation process is described further below with reference to FIG. 9.

According to another example illustrated by FIG. 1, the customer interface 124 provides information describing one or more parses of transcription information to a user via the user interface. As described further below, this parse information may grammatically structured text included in tokens stored the transcription information. This parse information may be subsequently processed by caption generation and positioning processes, such as the caption generation and positioning processes described further below with reference to FIGS. 4-18.

In another example illustrated by FIG. 1, the customer interface 124 receives media file information from the user interface. This media file information includes a media file and information indicating a knowledge domain to which the content included in the media file belongs. Responsive to receipt of this media file information, the customer interface 124 stores the media files in the media file storage 136 and stores a unique identifier of the media file, and the domain information in the job data storage 134.

According to another example illustrated by FIG. 1, the customer interface 124 receives media file information from the user interface. This media file information includes a media file and media file information indicating a project to be associated with the media file from which the domain may be derived. A project is a set of media files grouped by a customer according to domain or other media file attribute. Responsive to receipt of this media file information, the customer interface 124 stores the media files in the media file storage 136 and stores a unique identifier of the media file and other media file information in the job data storage 134.

According to another example illustrated by FIG. 1, the customer interface 124 provides media file information to the user interface. This media file information includes unique identifiers of one or more media files previously received from the customer 110 and the project information associated with the received media files. In this example, the customer interface 124 receives modifications to the provided media file information made by the customer 110 via the user interface. Responsive to receiving the modifications, the customer interface 124 stores the modifications in the job data storage 134 and the media file storage 136.

In another example illustrated by FIG. 1, the editor interface 126 provides a user interface to the editor 112 via the network 118 and the client computer 106. For instance, in one embodiment, the editor interface 126 is configured to serve a browser-based user interface to the editor 112 that is rendered by a web-browser running on the client computer 106. In this embodiment, the editor interface 126 exchanges information with the editor 112 via this user interface and stores the exchanged information within the job data storage 134 or the media file storage 136. The editor interface 126 may also retrieve information stored in the job data store 134 or the media file storage 136. Examples of the information stored in the job data storage 134 include information descriptive of captions, media files, customers, projects, and transcriptions. Examples of the information stored in the media file storage 136 include caption information specifying a set of caption frames. Caption frames store position information that identifies locations within video frames at which caption text included in the caption frames is superimposed on the video frame during playback of the media file.

In one example illustrated by FIG. 1, the editor interface 126 provides a user interface with features designed to be used by a human captioning expert. These features may include: thumbnail views of video frames where the caption frames have been repositioned; an overall display of the trajectory of repositioning confidence for all extracted video frames; a user interface element configured to a display thumbnails for non-repositioned locations in response to user input selecting a position on the confidence trajectory; a user interface element configured to play a media file along with the captions at any time in response to user input selecting either a thumbnail or a location in the confidence trajectory; a user interface element configured to reposition the caption frames manually in response to user input selecting a position on a thumbnail or input entering an XY, or X, or Y raster position into a pop text box; and a user interface element configure to save the caption frames with the updated position information.

In other embodiments, the editor interface 126 is configured to facilitate a caption placement process executed by the editor 112, who is an expert on caption placement. In executing according to this configuration, the editor interface 126 may interact with the caption engine 132, the job data storage 134, and the media file storage 136. One example of a caption placement process is described further below with reference to FIG. 19.

Although the examples described above focus on a web-based implementation of the customer interface 124 and the editor interface 126, embodiments are not limited to a web-based design. Other technologies, such as technologies employing a specialized, non-browser based client, may be used to implement the user interface without departing from the scope of the aspects and embodiments disclosed herein. For instance, according to one embodiment, the customer interface 124 is a simple, locally executed upload client that allows the customer to do nothing more than upload media files to the server via FTP or some other protocol.

According to various embodiments illustrated by FIG. 1, the caption engine 132 is configured to produce and position caption information including highly readable captions from transcription information stored in the job data storage 124 and the media file storage 136. As is further described below, in some embodiments, the transcription information used to create the caption information is created automatically by an ASR device, such as the ASR device 122. In other embodiments, the transcription information is created by a job transcription market, such as the job transcription market 100 described in FIG. 1 of '123 Application. In these embodiments, the transcription may include edits made by professional editors as detailed in the '123 Application. These edits may include modified text, timing information, punctuation marks, and annotations, among other information.

In one embodiment illustrated by FIG. 1, the caption engine 132, in executing according to its configuration, exchanges information with the customer interface 124, the system interface 128, the job data storage 134, and the media file storage 136. The exchanged information may include any information used by the caption system 100 to generate and store caption information. Specific examples of exchanged information include caption information, media file information, customer information, project information, and transcription information.

According to one embodiment illustrated in FIG. 1, the caption engine 132 is configured to send a request for ASR processing of unprocessed media files to the system interface 128. In these embodiments, the system interface 128 is configured to receive requests for ASR processing, and, in response to these requests, provide the unprocessed media files to the ASR device 122. The ASR device 122 is configured to receive a media file, to perform automatic speech recognition on the received media file and to respond with draft transcription information that includes a draft transcription of the content of the received media file. The draft transcription information also includes synchronization information, such as time coding or frame coding, that associates tokens included in the draft transcription with particular portions of the received media file. In other embodiments, the system interface 128 is further configured to receive the draft transcription information, store the draft transcription information in the job data storage 134 and the media file storage 136, and notify the caption engine 132 of the availability of the draft transcription information.

In one example illustrated by FIG. 1, the caption engine 132 receives an identifier of a newly stored media file from the customer interface 124. Responsive to receipt of this identifier, the caption engine 132 provides a request to perform ASR processing on the media file to the system interface 128. The system interface 128, in turn, retrieves the media file from the media file storage 136 and provides the media file, along with a set of parameters that indicate appropriate language, acoustic, and formatting models, to the ASR device 122. The ASR device 122 processes the media file and responds with draft transcription information that includes a time-coded draft transcription, and other associated data. The system interface 128 receives the draft transcription information, stores the draft transcription information in the job data storage 134 and the media file storage 136 and notifies the caption engine 132 of the availability of the draft transcription information.

In some embodiments, the caption engine 132 is configured to identify unprocessed transcription information stored in the job data storage 134 and the media file storage 136. In some of these embodiments, the caption engine 132 identifies unprocessed transcription information after receiving an indication of the storage of one or more unprocessed transcriptions from another component, such as the customer interface 124 or the system interface 128 described above. In others of these embodiments, the caption engine 132 identifies unprocessed transcription information by periodically executing a query, or some other identification process, that identifies new, unprocessed transcriptions by referencing information stored in the job data storage 134 or the media file storage 136.

In other embodiments, the caption engine 132 is configured to perform a variety of processes in response to identifying unprocessed transcription information or in response to receiving a notification identifying unprocessed transcription information that is available. For instance, in one embodiment, after identifying that unprocessed draft transcription information is available, the caption engine 132 determines whether a professionally edited version of the draft transcription is available. If so, the caption engine 132 uses the transcription information that includes the professionally edited version of the draft transcription to generate captions as described further below. If not, the caption engine 132 either uses the transcription information that includes the ASR-generated version of the draft transcription to generate captions, or defers generation of captions until a professionally edited version becomes available.

In some embodiments, the caption engine 132 is configured to, as an initial step in generating captions, employ natural language processing techniques to determine the domain of the subject matter presented in the transcription information and to store this domain information in the job data storage 134. In these embodiments, in response to determining, or receiving, an indication of the domain of subject matter presented in the transcription information, the caption engine 132 identifies and selects a general parser, a specialized parser, or a parser trained with a specialized linguistic bank, based on the domain information associated with the transcription information. For example, if the media file includes a presentation describing combinatorics in the Mandarin language, the caption engine 132 may select a specialized parser that is trained with Mandarin linguistic bank that includes mathematics nomenclature. In this way, the caption engine 132 selects a parser that is likely to perform well given the subject matter of the transcription information.

In other embodiments, the caption engine 132 is configured to utilize the selected parser, or some other predetermined parser (e.g., the Stanford parser), to parse the transcription information into parse information. The linguistic organization of the parse information generated by the utilized parser may structure text stored in tokens included in the transcription information into one or more elements according to paragraphs, sentences, phrases, words, and punctuation included in the transcription information. Each element may be associated with one or more part-of-speech ("POS") tags.

In some embodiments, the parser used is a statistical parser, and the parse information may be associated with a score that characterizes the accuracy of the linguistic organization included in the parse information. In other embodiments, the parser used may generate a discrete element for each respective token included in the transcription information and may associate each element with a POS tag. Such a parser may be particularly useful where, for example, a statistical parser is unable to return a successful parse. In some embodiments, the utilized parser determines the POS tag to associate with an element by identifying the token included in the element in a table that relates tokens to POS tags.

According to various embodiments, the caption engine 132 organizes parse elements into a variety of groups and relationships. For instance, in at least one embodiment, the caption engine 132 stores each element, timing information associated with the element, and any POS tags associated with the element in a data structure such as the parseElement data structure described below. In other embodiments, the elements may be loaded into a singly linked list, a doubly linked list, a circularly linked list, a single or multidimensional array or one or more tree structures. Thus embodiments are not limited to a tree or any other particular data structure.

In at least one embodiment, the caption engine 132 is configured to load the parse information into one or more hierarchical parse trees that include elements within tree nodes. Also in these embodiments, each tree node included in each parse tree includes a data structure such as the following parseElement data structure:

struct parseElement
   string words//Contains terminal tokens, with spaces
   int string_length//Length includes all internal spaces
   int level//Depth in tree
   float begin_time
   float end_time
   string part_of_speech_tag
   parseElement nextElement//At the same level (null at last element of level)
   parseElement nextLevel//First element at next level (null for leaves)
end As shown, this exemplary parseElement data structure includes the following fields: words, string_length, level, begin_time, end_time, part_of_speech_tag, nextElement, and nextLevel. The words field stores a string of tokens included in the transcription information. The string_length field stores an integer that represents the length of the words field. The level field stores an integer that represents the level of the tree node including this parseElement. The begin_time stores a floating point representation of a starting point of a window within in the media file associated with the tokens included in the words field. The end_time stores a floating point representation of an ending point of the window within the media file. The part_of_speech_tag stores a string representative of the part-of-speech of the tokens included in the words field. The nextElement field stores a reference to a parseElement included in the next tree node at the same level of the tree as the tree node including this parseElement. The nextLevel field stores a reference to a parseElement included in the first child node of the node including this parseElement.

In at least one embodiment, each level of a hierarchical parse tree corresponds to a grammatical structure having a different level of complexity. For instance, leaf nodes of a hierarchical parse tree may represent tokens included in the transcription information. Parents of the leaf nodes may represent phrases including the tokens stored in their children. Thus a linear parse of the tokens included in the transcription information may be identified by a traversing the leaf nodes of the parse tree. Parents of the phrase nodes may represent clauses including the phrases stored in their children. Parents of the clause nodes may represent sentences including the clauses stored in their children. Parents of the sentence nodes may represent paragraphs including the sentences stored in their children. This increasing grammatical complexity may continue to progress as the tree is walked from the leaf nodes toward to root node. Particular examples of hierarchical parse trees are described further below with reference to FIGS. 7 and 8.

In some embodiments, the caption engine 132 is configured to build caption frames from elements (e.g. parseElements) by executing a framing process. In one embodiment, the framing process builds caption frames using sub-elements included in elements in conjunction with caption-length, words per second, characters per second, or other constraints. Examples of sub-elements of an element include elements stored within tree nodes that are children of the node storing the element. In other embodiments, the framing process favors use of elements stored within higher levels of a parse tree over use of elements stored within lower levels of the parse tree, thereby favoring grammatical structures of increased complexity over those having less complexity. One example of a framing process implemented by the caption engine 132 is described further below with reference to FIG. 5.

In other embodiments, the caption engine 132 is configured to balance text across a consecutive series of caption frames by executing a balancing process. In one embodiment, the balancing process uses elements associated with caption frames, and sub-elements of the associated elements, to decrease or minimize the variance of a characteristic associated with the series of caption frames. The balancing process may utilize sub-elements to split an associated element across two caption frames. One example of a balancing process implemented by the caption engine 132 is described further below with reference to FIG. 6.

In other embodiments, the caption engine 132 is configured to position caption frames within their corresponding video frames so as to not interfere with other identified content displayed during playback of the media file. In some embodiments, the caption engine 132 is configured to determine whether identified content is located in particular regions of video frames by executing a text detector such as TiRG, TextFinder, or AdaBoost. In at least one embodiment, the caption engine 132 positions caption frames by executing a positioning process. In this embodiment, the positioning process uses caption frame characteristics to determine the geometry of the caption text of the caption frame within the video frame, determine whether the caption text would obfuscate other identified content if displayed at a default location within the video frame, and if so, move the caption frame to a different location where identified content is not being rendered, if such a location is available. One example of a positioning process implemented by the caption engine 132 is described further below with reference to FIG. 17.

In other embodiments, the caption engine 132 is configured to smooth positional transitions between caption frames associated with a series of consecutive video frames. In at least one embodiment, the caption engine 132 smoothes positional transitions by executing a smoothing process. In this embodiment, the smoothing process determines whether any series of one or more consecutive caption frames fails to meet a minimum duration, and if so, either repositions the series to its previous position or adds additional caption frames to the series until the minimum duration is met. One example of a smoothing process implemented by the caption engine 132 is described further below with reference to FIG. 19.

After this processing is complete, in some embodiments, the caption engine 132 is configured to make finalized caption information available to the customer, who may then download the finalized caption information for his or her own use via the customer interface 124. The finalized caption information is also maintained in the media file storage 136 for reference and further processing, as discussed herein.

Each of the interfaces disclosed herein may both restrict input to a predefined set of values and validate any information entered prior to using the information or providing the information to other components. Additionally, each of the interfaces disclosed herein may validate the identity of an external entity prior to, or during, interaction with the external entity. These functions may prevent the introduction of erroneous data into the caption system 100 or unauthorized access to the caption system 100.

Figure 2:
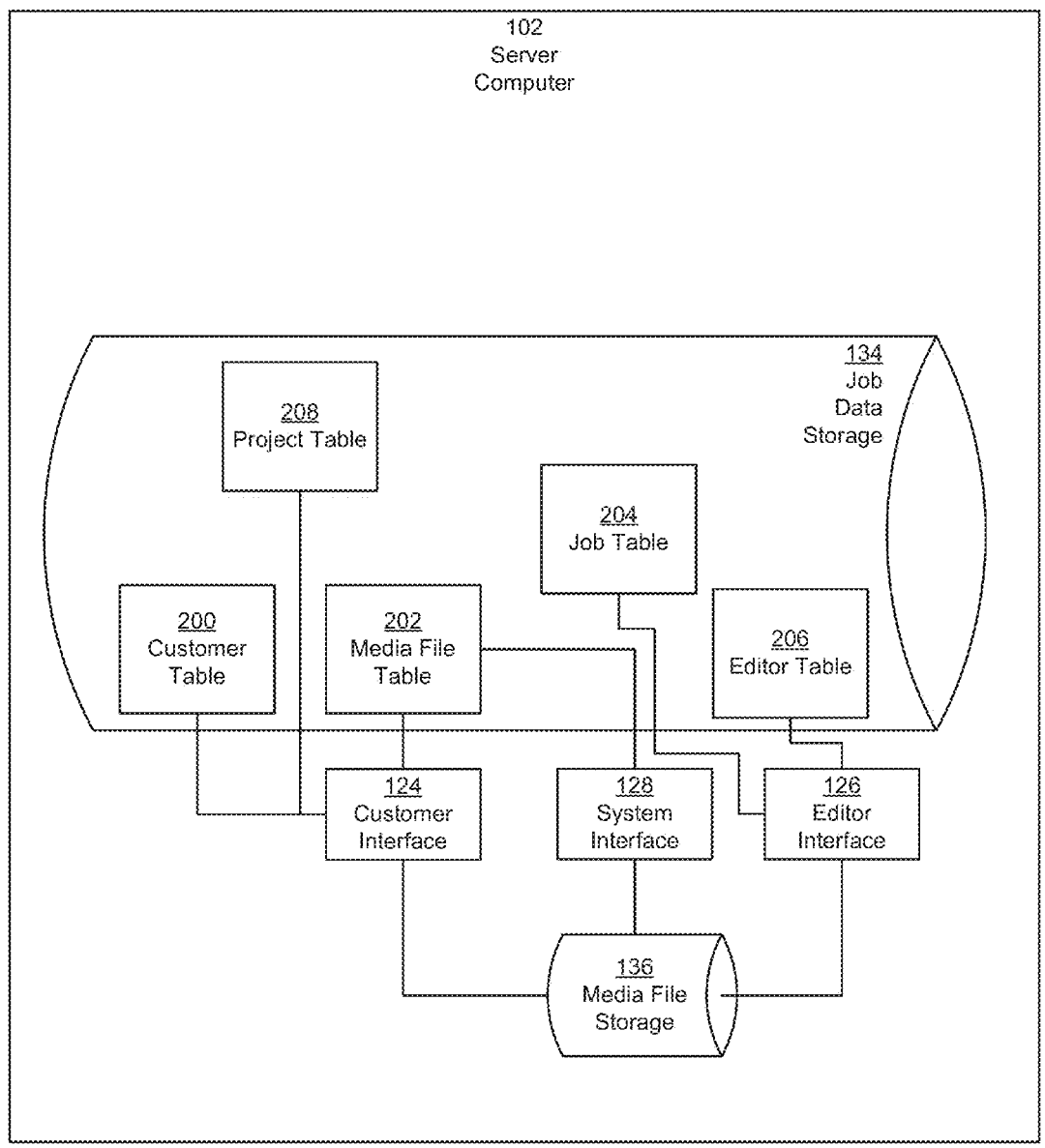
FIG. 2 is a schematic diagram of the server computer shown in FIG. 1, including data stores.

FIG. 2 illustrates the server computer 102 of FIG. 1 in greater detail. As shown in FIG. 2, the server computer 102 includes the job data storage 134, the customer interface 124, the system interface 128, the editor interface 126, and the media file storage 136. In the embodiment illustrated in FIG. 2, the job data storage 134 includes a customer table 200, a media file table 202, a job table 204, an editor table 206, and a project table 208.

In the embodiment illustrated in FIG. 2, the media file storage 136 includes a file system configured to store media files, transcription files, and caption files and acts as a file server for other components of the caption system. In another embodiment, the media file storage 136 includes identifiers for files stored on another computer system configured to serve files to the components of the caption system.

In some embodiments, transcription information includes a (time-coded or non-time-coded) transcription of the content included in a media file. A time-coded transcription is comprised of a textual representation of the content of the media file, where each token has associated with it indicia of the location in the media file to which it applies. The tokens may include words, numerics, punctuation, speaker identification, formatting directives, non-verbal annotations (such as [BACKGROUND NOISE], [MUSIC], [LAUGHTER], [PAUSING]) and other markings or text that may be useful in describing the media file content. The empty string may also be used as a token, in which case the location indicia serves to keep the transcription synchronized with the media file content in the absence of useful textual information. In the case of the transcription from the ASR device, these empty-string tokens may be used if the ASR process was confident that some transcription-worthy event has occurred at that location, but is unsure of the particular identity of that event. In this case, having the location indicia associated with the event facilitates synchronized correction. In at least some embodiments, at least some of this transcription information is stored in the media file storage 136 as a transcription file. Table 1 illustrates one example of time-encoded transcription information:

TABLE 1

| Caption Text | Begin Time | End Time |
| --- | --- | --- |
| Our | 0.0 | 0.2 |
| hospital | 0.2 | 0.55 |
| is | 0.55 | 0.66 |
| an | 0.66 | 0.70 |
| academic | 0.70 | 1.15 |
| teaching | 1.15 | 1.73 |
| facility | 1.73 | 2.36 |
| serving | 2.36 | 2.81 |
| the | 2.81 | 2.94 |
| greater | 2.94 | 3.27 |
| Toronto | 3.27 | 3.75 |
| area. | 3.75 | 4.50 |
| Every | 4.50 | 5.50 |
| day | 5.50 | 5.83 |
| we | 5.83 | 6.02 |
| produce | 6.02 | 6.46 |
| thousands | 6.46 | 6.95 |
| upon | 6.95 | 7.27 |
| thousands | 7.27 | 8.11 |
| of | 8.11 | 8.25 |
| documents. | 8.25 | 9.11 |
| [SILENCE] | 9.11 | 9.50 |

In some embodiments, caption information includes text and timing information (e.g., begin time and end time) relative to a predetermine location (e.g., the start) within the media. The timing information indicates a section within the media during which the text should be superimposed upon the media. The caption information may also include line-break information, indicating where the text should be split into different lines. In some embodiments, caption information may include position information for text, such as the pixel x, y coordinates indicating where beginning of the text should appear superimposed on the media. In other embodiments, the caption may include formatting information such as language, character encoding, text justification, font, font-size, bolding, underlining, and italicizing, among other formatting information. In at least one embodiment, the caption information may include information that is configured according to any of several standards for caption information, such as the SRT format, the W3C timed text format, and the DFXP format, among others.

The customer table 200 stores information descriptive of the customers who employ the caption system to have their media files captioned. In at least one embodiment, each row of the customer table 200 stores information for a customer and includes a customer_id field, and a customer_name field. The customer_id field stores an identifier of the customer that is unique within the caption system. The customer_name field stores information that represents the customer's name within the caption system. The customer_id is used as a key by a variety of functions disclosed herein to identify information belonging to a particular customer.

The media file table 202 stores information descriptive of the media files that have been uploaded to the caption system for processing. In at least one embodiment, each row of the media file table 202 stores information for one media file and includes the following fields: file_id, file_name, customer_id, state, duration, domain, transcript_location, instructions, and caption_location. The file_id field stores a unique identifier of the media file. The file_name field stores the file system name of the media file. The customer_id field stores a unique identifier of the customer who provided the media file. The state field stores information that represents the state of the media file. The duration field stores information that represents the duration of the content of the media file. The domain field stores information that identifies a subject matter domain to which the media file belongs. The transcript_location field stores an identifier of a location of transcription information associated with the media file. The instructions field stores caption formatting instructions associated with the media file. The caption_location field stores an identifier of a location of caption information associated with the media file. The file_id is used as a key by a variety of functions disclosed herein to identify information associated with a particular media file. In some embodiments, the media file table 202 may store multiple versions of caption information associated with particular transcription information. Each of these versions may be produced using different configurations and each may reflect different user preferences, including preferences motivated by constraints of various media players.

The job table 204 stores information descriptive of the jobs to be completed within the transcription job market. In at least one embodiment, each row of the job table 204 stores information for one job and includes the following fields: job_id, file_id, deadline, state, job_type, pay_rate, editor_id, progress, flags, XRT, corrections, audit_score, hide, ASR_distance. The job_id field stores an identifier of the job that is unique within the transcription job market. The file_id field stores the unique identifier of the media file to be transcribed by an editor working the job. The deadline field stores information that represents the date by which the job must be complete. The state field store the current state (or status) of the job. Examples values for the state field include New, ASR_In_Progress, Available, Assigned, Editing_In_ Progress, and Complete. The job_type field stores information that represents a type of work that must be performed to complete the job, for example editing, QA, auditing, etc. The pay_rate field stores information that represents a pay rate for completing the job. The editor_id field stores the unique identifier of the editor who has claimed this job. The progress field stores information that represents an amount of work completed for the job. The flags field stores information that represents the number and type of flags assigned to the job during editing, as described above. The XRT field stores information that represents the times-real-time statistic applicable to the job. The corrections field stores information that represents corrections made to the draft transcription as part of the job. The audit_scores field stores information that represents the results of auditing the job. The hide field stores information that determines whether components, such as the market engine 132 and the editor interface 126, should filter out the job from job views. The ASR_distance field stores information that represents the number of changes from the draft transcription made as part of the job. The job_id is used as a key by a variety of functions disclosed herein to identify information associated with a particular job.

The editors table 206 stores information descriptive of the editors who prepare transcriptions within the transcription job market. In at least one embodiment, each row of the editors table 206 stores information for one editor and includes the following fields: editor_id, roles, reward_points, domains, and special_capabilities. The editor_id field stores an identifier of the editor that is unique within the transcription job market. The roles field stores information representative of roles that the editor is able to assume with the transcription job market, for example, editor, QA, auditor, etc. Examples of these roles include editor, quality assurance editor, and auditor. The reward_points field stores information that represent the number of reward points accumulated by the editor. The domains field stores information that represents subject matter domains of media files that the editor has permission to edit. The special_capabilities field stores information that represents specialized skills that the editor possesses. The editor_id is used as a key by a variety of functions disclosed herein to identify information belonging to a particular editor.

In the embodiment of FIG. 2, the project table 208 stores information descriptive of projects that the caption system is being utilized to complete. In at least one embodiment, each row of the project table 208 stores information for a project and includes an project_id field, a project_name field, a customer_id field, and a domain field. The project_id field stores information that identifies a group of media files that belong to a project. The project_name field stores information that represents the project's name within the caption system. The customer_id field indicates the customer to whom the project belongs. The domain field stores information that identifies a subject matter domain of media files included in the project. The project_id is used as a key by a variety of functions disclosed herein to identify information grouped into a particular project.

Various embodiments implement the components illustrated in FIG. 2 using a variety of specialized functions. For instance, according to some embodiments, the customer interface 124 uses a File_Upload function and a File_Update function. The File_Upload function uploads a file stored on a customer's computer to the server computer 102 and accepts parameters including customer_id, project_id, filename, and optionally, domain. The customer_id parameter identifies the customer's unique customer_id. The project_id identifies the project to which the media file belongs. The filename parameter specifies the name of the media file to be uploaded by the customer interface 124. The domain parameter specifies the subject matter domain to which the media file belongs. In at least one embodiment, if the domain parameter is not specified, the caption engine 132 determines the value of the domain parameter from the value of the domain field of a record stored within the project table 208 that has a project_id field that is equal to the project_id parameter.

In other embodiments, the File_Update function updates an attribute of a media file record and accepts parameters including file_id, attribute, and value. The file_id parameter identifies the media file record with attributes that will be modified as a result of execution of the File_Update function. The attribute parameter identifies an attribute to be modified. In at least one embodiment, this attribute may be the domain or state of the media file, as stored in the media file table 202. The value parameter specifies the value to which the attribute is to be set as a result of executing the File_Update function.

In other embodiments, the system interface 128 uses a File_Send_to_ASR function and a File_Create_Draft function. The File_Send_to_ASR function provides a media file to the ASR device 122 and causes the ASR device 122 to perform automatic speech recognition on the content included in the media file. The File_Send_to_ASR function accepts parameters including file_id. The file_id parameter identifies the media file to be processed by the ASR device 122.

In other embodiments, the File_Create_Draft function creates draft transcription information for a media file and accepts parameters including file_id and ASR_output. The file_id parameter identifies the media file for which the draft transcription information will be created by execution of the File_Create_Draft function. The ASR_output parameter specifies the location of the ASR output generated by the ASR device 122 during its processing of the media file.

In other embodiments, the File_Create_Caption function creates caption information from transcription information and accepts parameters including file_id, caption_location, and transcript_location. The file_id parameter identifies the media file for which the caption information will be created by execution of the File_Create_Caption function. The caption_location parameter specifies the location to which the File_Create_Caption function will store the caption information. The transcript_location parameter specifies the location of the transcription information that the File_Create_Caption function will use to generate the caption information.

In other embodiments, the caption engine uses functions that are described further below with reference to FIGS. 4-9 and 17.

In other embodiments, the editor interface 126 uses the following functions: Job_Store_Output, Job_Update_Progress, Job_List_Available, Job_Preview, Job_Claim, and Job_Begin. The Job_Store_Output function stores the current version of the edited draft transcription and accepts parameters including a job_id. The job_id parameter identifies the job for which the current version of the edited draft transcription is being stored.

In other embodiments, the Job_Update_Progress function updates the progress attribute included in a job record and saves the current state of the transcription. The Job_Update_Progress function accepts parameters including job_id, transcription data and progress. The job_id parameter identifies the job record for which the progress attribute will be updated to the value specified by the progress parameter. The transcription data is saved to the location specified in the media file record associated with the job_id.

In other embodiments, the Job_List_Available function returns a list of jobs available to an editor and accepts parameters including editor_id, and optionally, job_type, domain, difficulty, deadline, and proposed_pay_rate. The editor_id parameter identifies the editor for which the list of available jobs is being created. The job_type parameter specifies a job_type to which each job in the list of available jobs must belong. The domain parameter specifies a domain to which each job in the list of available jobs must belong. The difficulty parameter specifies a difficulty that the media file associated with the job in the list must have. The deadline parameter specifies a deadline that each job in the list of available jobs must have. The proposed_pay_rate parameter specifies a proposed_pay_rate that the media file associated with the job must have. It is to be appreciated that meta rules, may also impact the list of jobs returned by the Job_List_Available function.

In other embodiments, the Job_Preview function causes a preview screen to be provided to a user interface and accepts parameters including editor_id and job_id. The editor_id parameter identifies the editor for which the preview is being provided. The job_id parameter specifies the job that is being previewed.

In other embodiments, the Job_Claim function records a job as claimed and accepts parameters including editor_id and job_id. The editor_id parameter identifies the editor for which the job is being claimed. The job_id parameter specifies the job that is being claimed.

In other embodiments, the Job_Begin function causes an editing screen to be provided to a user interface and accepts parameters including job_id. The job_id parameter specifies the job associated with the draft transcription to be edited.

Embodiments of the caption system 100 are not limited to the particular configuration illustrated in FIGS. 1 and 2. Various examples utilize a variety of hardware components, software components and combinations of hardware and software components configured to perform the processes and functions described herein. In some examples, the caption system 100 is implemented using a distributed computer system, such as the distributed computer system described further below with regard to FIG. 3.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 3:
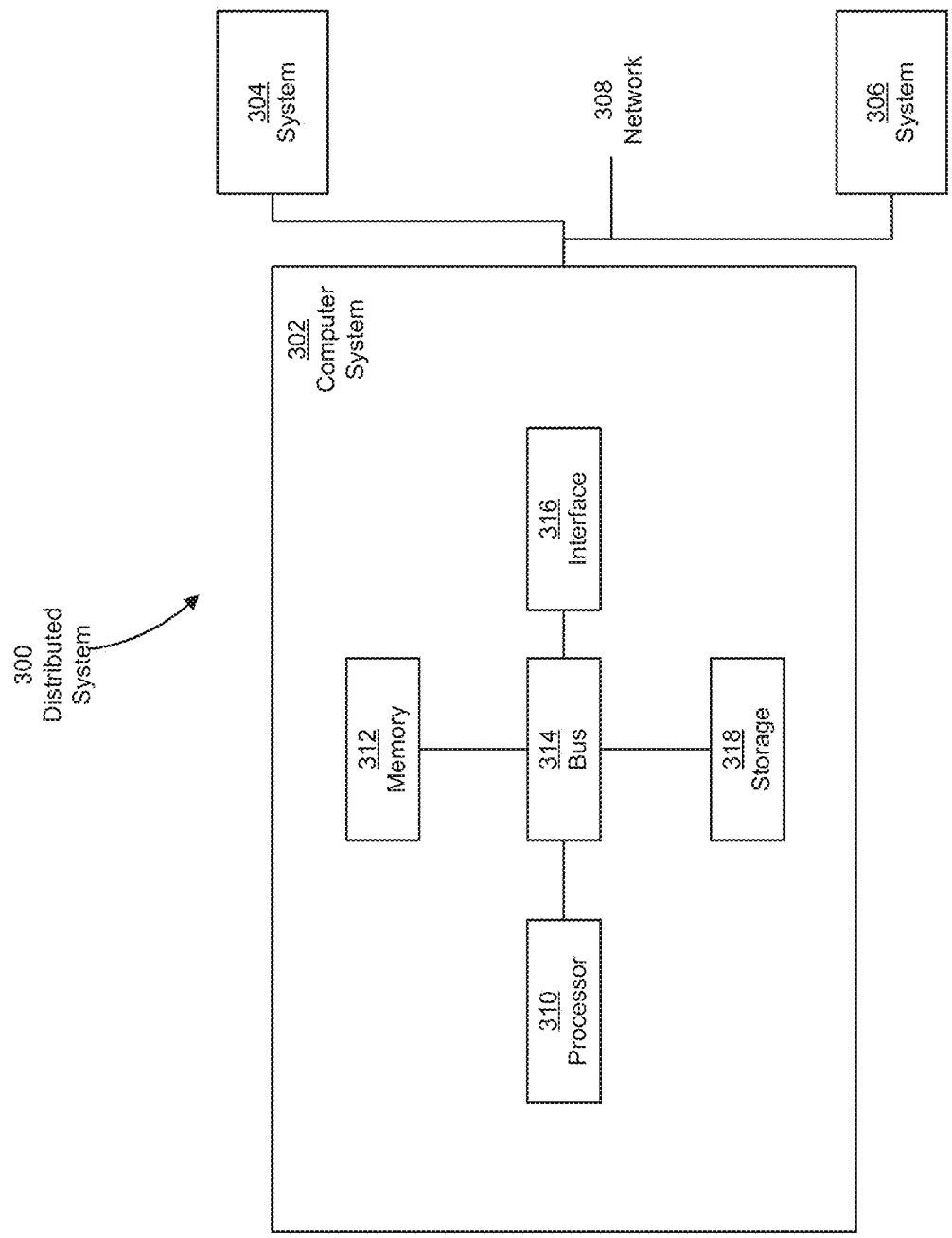
FIG. 3 is a schematic diagram of one example of a computer system that may perform processes and functions disclosed herein.

Referring to FIG. 3, there is illustrated a block diagram of a distributed computer system 300, in which various aspects and functions are practiced. As shown, the distributed computer system 300 includes one more computer systems that exchange information. More specifically, the distributed computer system 300 includes computer systems 302, 304 and 306. As shown, the computer systems 302, 304 and 306 are interconnected by, and may exchange data through, a communication network 308. The network 308 may include any communication network through which computer systems may exchange data. To exchange data using the network 308, the computer systems 302, 304 and 306 and the network 308 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 302, 304 and 306 may transmit data via the network 308 using a variety of security measures including, for example, TLS, SSL or VPN. While the distributed computer system 300 illustrates three networked computer systems, the distributed computer system 300 is not so limited and may include any number of computer systems and computing devices, networked using any medium and communication protocol.

As illustrated in FIG. 3, the computer system 302 includes a processor 310, a memory 312, a bus 314, an interface 316 and data storage 318. To implement at least some of the aspects, functions and processes disclosed herein, the processor 310 performs a series of instructions that result in manipulated data. The processor 310 may be any type of processor, multiprocessor or controller. Some exemplary processors include commercially available processors such as an Intel Xeon, Itanium, Core, Celeron, or Pentium processor, an AMD Opteron processor, a Sun UltraSPARC or IBM Power5+ processor and an IBM mainframe chip. The processor 310 is connected to other system components, including one or more memory devices 312, by the bus 314.

The memory 312 stores programs and data during operation of the computer system 302. Thus, the memory 312 may be a relatively high performance, volatile, random access memory such as a dynamic random access memory (DRAM) or static memory (SRAM). However, the memory 312 may include any device for storing data, such as a disk drive or other non-volatile storage device. Various examples may organize the memory 312 into particularized and, in some cases, unique structures to perform the functions disclosed herein. These data structures may be sized and organized to store values for particular data and types of data.

Components of the computer system 302 are coupled by an interconnection element such as the bus 314. The bus 314 may include one or more physical busses, for example, busses between components that are integrated within a same machine, but may include any communication coupling between system elements including specialized or standard computing bus technologies such as IDE, SCSI, PCI and InfiniBand. The bus 314 enables communications, such as data and instructions, to be exchanged between system components of the computer system 302.

The computer system 302 also includes one or more interface devices 316 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 302 to exchange information and to communicate with external entities, such as users and other systems.

The data storage 318 includes a computer readable and writeable nonvolatile, or non-transitory, data storage medium in which instructions are stored that define a program or other object that is executed by the processor 310. The data storage 318 also may include information that is recorded, on or in, the medium, and that is processed by the processor 310 during execution of the program. More specifically, the information may be stored in one or more data structures specifically configured to conserve storage space or increase data exchange performance. The instructions may be persistently stored as encoded signals, and the instructions may cause the processor 310 to perform any of the functions described herein. The medium may, for example, be optical disk, magnetic disk or flash memory, among others. In operation, the processor 310 or some other controller causes data to be read from the nonvolatile recording medium into another memory, such as the memory 312, that allows for faster access to the information by the processor 310 than does the storage medium included in the data storage 318. The memory may be located in the data storage 318 or in the memory 312, however, the processor 310 manipulates the data within the memory, and then copies the data to the storage medium associated with the data storage 318 after processing is completed. A variety of components may manage data movement between the storage medium and other memory elements and examples are not limited to particular data management components. Further, examples are not limited to a particular memory system or data storage system.

Although the computer system 302 is shown by way of example as one type of computer system upon which various aspects and functions may be practiced, aspects and functions are not limited to being implemented on the computer system 302 as shown in FIG. 3. Various aspects and functions may be practiced on one or more computers having a different architectures or components than that shown in FIG. 3. For instance, the computer system 302 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 302 may be a computer system including an operating system that manages at least a portion of the hardware elements included in the computer system 302. In some examples, a processor or controller, such as the processor 310, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 310 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities, such as customers or editors, to modify the parameters and thereby configure the behavior of the components.

Caption System Processes

Figure 4:
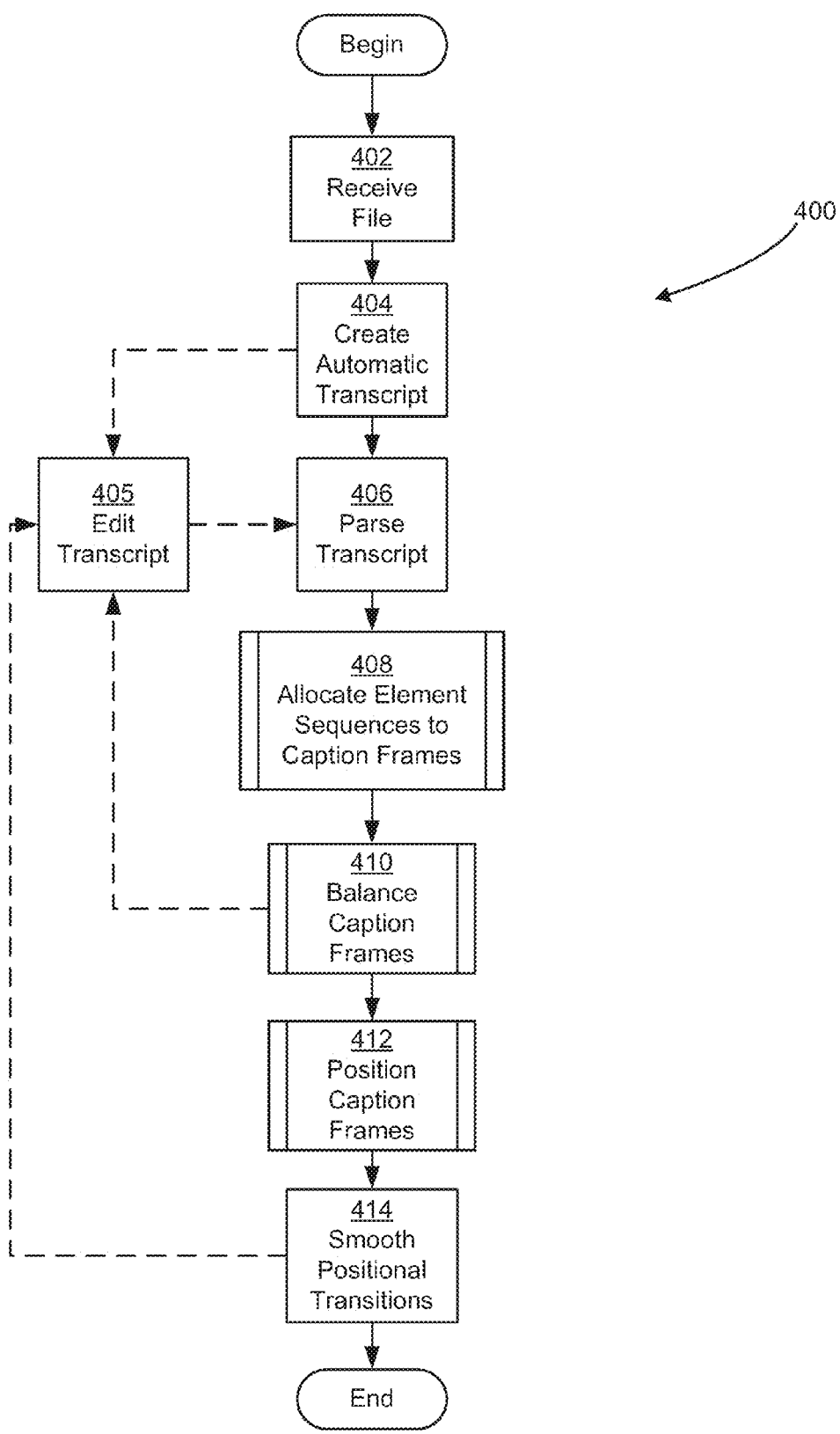
FIG. 4 is a flow diagram illustrating a process for generating captions.

In some embodiments processes are performed that generate captions using a caption system, such as the caption system 100 described above with reference to FIG. 1. An example of one of these caption generation processes is illustrated by FIG. 4. According to this example, the caption generation process 400 includes acts of receiving a media file, creating an ASR transcription, editing a transcription, parsing a transcription, allocating element sequences to caption frames, balancing caption frames and storing caption information, positioning caption frames, and smoothing caption transitions.

In act 402, the caption system receives a media file including content to be captioned. In at least one embodiment, the caption system receives the media file via a customer interface, such as the customer interface 124 described above with reference to FIG. 1. In this embodiment, the customer interface stores the media file in a media file storage, such as the media file storage 136 described above with reference to FIG. 1.

Next, in act 404, the customer interface requests that an ASR device, such as the ASR device 122 described above with reference to FIG. 1, produce draft transcription information via a system interface, such as the system interface 128 described above with reference to FIG. 1. In response to receiving the request, the ASR device produces draft transcription information for the media file and provides the draft transcription information to the system interface. In at least one embodiment, the system interface, in turn, executes the File_Create_Draft function described above to create a draft transcription file from ASR output included in the draft transcription information. The system interface next stores the draft transcription file in the media file storage and stores media file information descriptive of the media file and draft transcription information descriptive of the draft transcription file in a job data storage, such as the job data storage 134, described above with reference to FIG. 1.

In act 405, the customer interface or an editor interface, such as an editor interface as described in the '123 Application, optionally modifies the draft transcription information to improve its accuracy. For example, the customer interface or the editor interface may receive edits to the draft transcription information via a user interface. These edits may alter any aspect of the draft information including the text included in a token, or media sequencing (timing) information associated with or stored within the token. Further, these edits may add annotations (e.g., non-verbal descriptions of transcription information, such as [ANNOUNCER:], [CROWD NOISE], [SILENCE]) to the draft transcription information. In some embodiments, these annotations are disassociated with neighboring grammatical structures during subsequent processing, such as parsing of the transcription information. Responsive to receipt of the edited transcription information, the customer interface or editor interface stores the edited transcription information for subsequent processing. Examples of some additional actions taken by the customer interface during act 405 are described further below with reference to FIG. 9.

After the draft transcription information is created (and in some examples, edited), the caption system parses the draft or edited transcription information in act 406 by executing a caption engine, such as the caption engine 132 described above with reference to FIG. 1. In some embodiments, the caption engine parses the transcription information in response to a request to generate captions received from another component, such as the customer interface or the system interface. In other embodiments, in parsing the transcription information, the caption engine creates a parse tree for each sentence included in the transcription information and populates, for each sentence, a data structure that stores parse information. In still other embodiments, the caption engine may create a parse tree (or other data structure) for each paragraph (or other grammatical structure) within the transcription information. In at least one embodiment, the caption engine stores parse information for each element in the parseElement data structure described above with reference to FIG. 1. In this embodiment, the caption engine creates an ordered list of the elements for future processing. This ordered list may represent the entirety of, or a portion of, the transcription information.

In act 408, the caption engine allocates element sequences included in the parse to caption frames and stores caption information based on the caption frames. One example of a process executed within the caption engine in the act 408 is described below with reference to FIG. 5. In act 410, the caption system balances the caption frames and stores caption information based on the caption frames. One example of a process executed within the caption engine in the act 410 is described below with reference to FIG. 6.

In act 412, the caption engine positions caption frames in locations within video frames where content of lesser importance is located. One example of a process executed within the caption engine in the act 412 is described below with reference to FIG. 17. Another example of a process executed within the caption engine in the act 412 is described below with reference to FIG. 18.

In act 414, the caption engine smoothes positional transitions between caption frames and terminates the caption generation process 400. In some embodiments, within the act 414, the caption engine scans the entire set of caption frames associated with the media file to identify each series of consecutive caption frames that is positioned within a common region. As referred to herein, a common region refers to either a set of default regions or a set of candidate regions in which captions frames from the series are positioned. As such, a common region is located in substantially the same location in each video frame associated with the series, some variance given for differing geometries of respective caption text in the each caption frame of the series. In some embodiments, the caption engine identifies each series by reading the position information stored in each caption frame, determining that the position information of each caption frame positions each caption frame within an identified region, and grouping consecutive caption frames that share identified regions. Next, the caption engine identifies each series of consecutive caption frames that does not span a minimum duration that is a value of a configurable parameter. Each series that does not span the minimum duration is referred to herein as an "abbreviated series." According to various embodiments, to avoid "flashing" of caption text around consecutive video frames, the caption engine may execute any one of the following actions: change the position information of each of the caption frames of the abbreviated series to a common region of a series adjacent to the abbreviated series, thereby creating a combined series, and repeat this "joining" action until the combined series spans the minimum duration; change position information of caption frames belonging to series adjacent to the abbreviated series to position these caption frames within the common region of the abbreviated series, thereby extending the duration of the abbreviated series while decreasing the duration of either or both of the adjacent series; change the position information of caption frames belonging to series adjacent to the abbreviated series or caption frames belong to the abbreviated series to join together caption frames that are textually related (i.e., that are part of the same textual unit, such as a phrase, a sentence, or a paragraph), thereby creating a combined series, and repeat this joining action until the combined series spans the minimum duration (or beyond, to create a combined series of textually related caption frames).

According to one example, the caption engine smoothes positional transitions between caption frames according to a caption smoothing process defined by the Pseudo-Code Listing provided at the end of this Detailed Description. Within the act 414, after smoothing positional transitions of the caption frames by, for example, executing the caption smoothing process, the caption engine creates caption information by executing act 522 described further below with reference to FIG. 5.

Processes in accord with the caption generation process 400 enable caption systems to automatically generate captions that are highly readable and well positioned to not interfere with other identified content displayed during playback of a media file.

Figure 5:
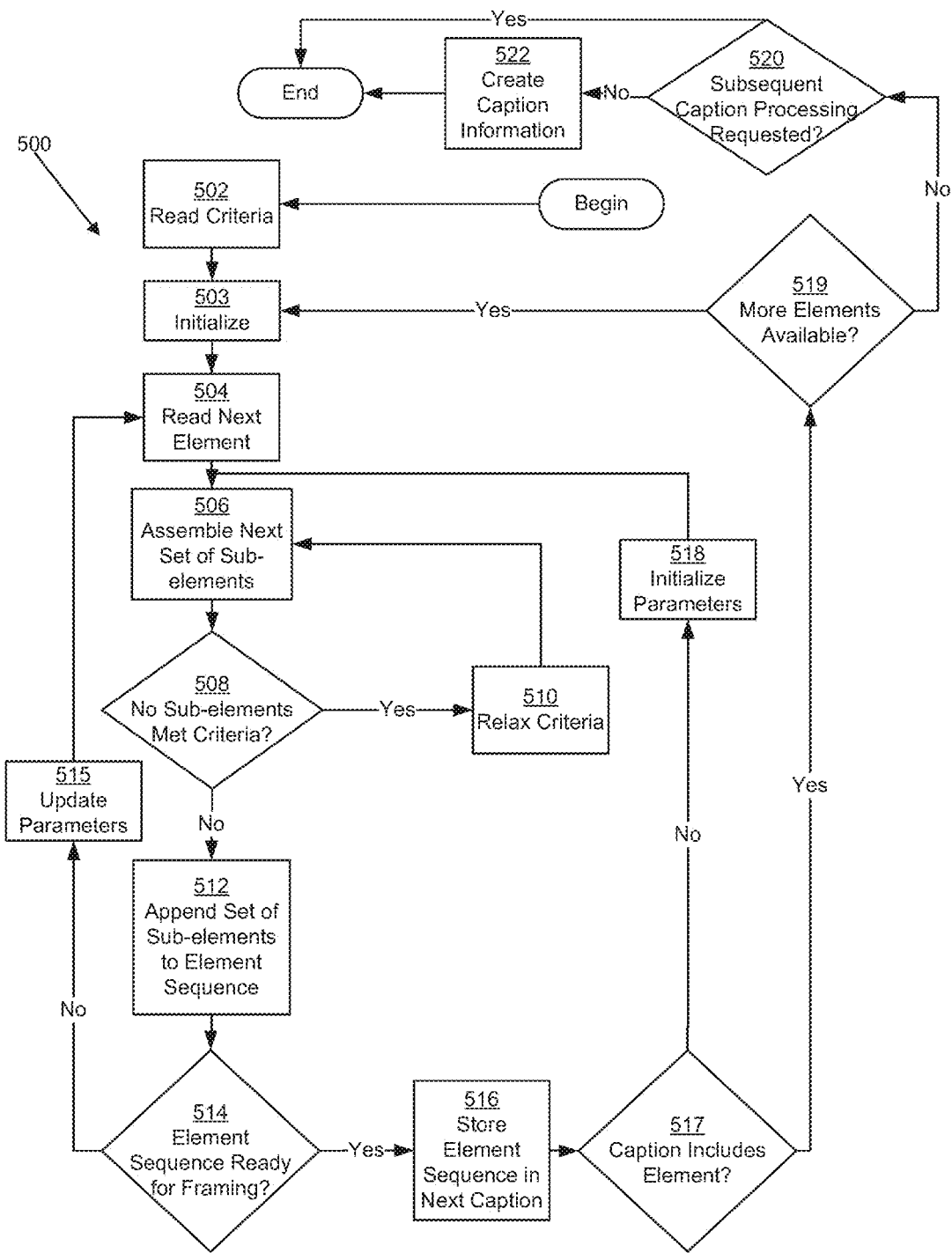
FIG. 5 is a flow diagram illustrating a process for associating element sequences with captions.

As discussed above with reference to FIGS. 1 and 4, in some embodiments processes that automatically frame transcription information within captions are performed using a caption system, such as the caption system 100 described above with reference to FIG. 1. An example of one of these framing processes is illustrated by FIG. 5. According to this example, the framing process 500 includes several acts that are described further below.

In act 502, a caption engine, such as the caption engine 132 described above with reference to FIG. 1, reads criteria used to determine elements that are acceptable for inclusion within a caption frame. These criteria may specify one or more target characteristics for a caption. For instance, in one embodiment this criteria specifies a maximum length for a caption, a maximum number of lines per caption, a maximum length for a line of a caption, a maximum level within the parse tree for elements, a minimum display duration measured in duration per word or duration per character, and that caption lines may not end with elements internal to a phrase (or other predetermined grammatical structure) stored in leaf nodes at or above a certain level within the parse tree. In some embodiments, the criteria are parameters that are configurable via a user interface presented by the caption system.

In act 503, the caption engine initializes a data structure to hold a sequence of elements. This data structure may represent the set of caption frames for the entire transcription or for a portion of the transcription. Further, within the act 503, the caption engine initializes the values of several parameters that track the progress of the caption engine in allocating elements to caption frames. In one example, the caption engine assigns the next element in the ordered list of elements to the topOfTree parameter, assigns a value of 0 to the chars_so_far parameter, and assigns a value of 0 to a duration_so_far parameter. It is to be appreciated that the next element assigned to the topOfTree parameter may be the first element where the act 503 has not previously been executed within this instance of the framing process 500.

In act 504, the caption engine reads a next element to be included in a caption frame (e.g., the topOfTree parameter). In at least one embodiment, the element corresponds to parse information corresponding to a sentence included in transcription information.

In act 506, the caption engine assembles a next set of sub-elements from the element using the element and the criteria read in act 502. According to one embodiment, in the act 506, the caption engine executes a sequence of instructions compiled from source code similar to the following recursive pseudo code, which references the parseElement structure described above:

```
collectParseTokens(parseElement topOfTree, chars_so_far, duration_so_far)
   n_chars=topOfTree.string_length;
   total_chars=chars_so_far+n_chars;  //already includes spaces
   duration=topOfTree.end_time−topOfTree.begin_time;
   if ((topOfTree.parse_level>MAX_PARSE_LEVEL)||
   (((duration_so_far+duration)/total_chars)<MIN_DURA-
      TION_PER_CHAR)){return NULL;
   }
   if (total_chars<=MAX_CAPTION_LENGTH) {
   //we are short enough, so return
      return topOfTree
   }
```

```
else {
//we are too long, so we must descend into the tree to
    collect
//shorter sequences
elements=[ ]
    parseElement*E=topOfTree→nextLevel
    while (E!=NULL) {
        F=collectParseTokens(E, chars_so_far, duration_so-
            _far)
    if (F==NULL) {
        return elements//no more conforming elements of add
    }
    elements.concat F//add this series of elements to a caption
        E=E→nextElement
    chars_so_far=elements.total_length_of_strings+element-
        s.length//add spaces
    duration_so_far=elements.total_duration
    }//for each parseElement
    return elements
    }//else
}//if
}
```

Within this pseudo code example, MAX_CAPTION_LENGTH specifies a maximum length for a caption, MAX_PARSE_LEVEL specifies a maximum level within the parse tree for tokens, and MIN_DURATION_PER_CHAR specifies a minimum display duration per character.

In some embodiments, in executing the act 506, the caption engine uses criteria specifying that caption frames may not end at elements (or sub-elements) storing with one or more POS tags or possessing other predetermined characteristics that cause the element to be deemed inseparable from one or more subsequent elements (or sub-elements). For example, the caption engine use criteria specifying that caption frames may not end at an article, a preposition, a possessive noun, a nouns within a compound proper noun, or a leading part of title or an annotation. In other embodiments, the caption engine may apply rules to preferably break caption frames after particular punctuation marks (e.g., period, semi-colon, hyphen, comma, etc.) or after other annotations.

In act 508, the caption engine determines whether any of the sub-elements of the element met the criteria. In one embodiment, the caption engine makes this determination by determining whether the next set of sub-elements includes no sub-elements. If so, the caption engine executes act 510. Otherwise, the caption engine executes act 512.

In the act 510, the caption engine determines whether it is configured to temporarily relax the criteria in situations where none of the sub-elements of the element meet the criteria (e.g., the next set of sub-elements includes no sub-elements). If so, the caption engine relaxes the criteria in accord with its configuration and executes the act 506. For example, in one embodiment, where the next set of sub-elements is null, the caption engine temporarily increases the maximum parse tree level by 1. In other embodiments, the caption engine temporarily increases the maximum caption length or other criterion included in the criteria.

In the act 512, the caption engine appends the next set of sub-elements to an element sequence. In act 514, the caption engine determines whether the element sequence is ready for framing. In some embodiments, the caption engine determines the element sequence is ready for framing by determining that the element sequence includes information (e.g., elements or sub-elements) other than the element. If not, the caption engine assigns the next element in the ordered list of elements to the topOfTree parameter in act 515. Also, in the act 515, the caption engine assigns the total string length of the elements in the element sequence to the chars_so_far parameter and assigns the total duration in the element sequence to the duration_so_far parameter. If the element sequence is ready for framing, the caption engine stores the element sequence in the next caption frame in act 516.

In act 517, the caption engine determines whether the caption frame includes the element (i.e., all sub-elements of the element). If not, the caption engine assigns a value of 0 to the chars_so_far parameter and assigns a value of 0 to a duration_so_far parameter in the act 518 and executes the act 506 to attempt to assemble a new caption frame that includes the sub-elements of the element that are not included in the caption frame. Otherwise, in act 519, the caption engine determines whether more elements are available for framing. If so, the caption engine executes the act 503 to attempt to frame the next element. Otherwise, the caption engine executes the act 520.

In the act 520, the caption engine determines whether subsequent caption processing has been requested via, for example, values of one or more configurable parameters or input received from a user interface. If not, the caption engine creates caption information by executing the act 522. Otherwise, the caption engine terminates the current process.

In the act 522, caption information is produced from the caption frames. In some embodiments, the caption engine iterates through the caption frames, and for each caption, extracts the text from each element in the caption frame and adds a space between the text extracted from each element. Also, in these embodiments, the caption engine inserts line breaks in the text where, for example, the length of the text exceeds a maximum length specified by a MAXIMUM_LINE_LENGTH parameter. In some embodiments, line breaks are inserted between elements in the text such that the difference in line-lengths in captions with multiple lines is reduced. Further, in at least one embodiment, the caption engine extracts the begin time from the first element in the caption frame and the end time from the last element in the caption frame.

In some embodiments, as part of the act 522, the caption engine adjusts the begin time and the end time of one or more caption frames based on the elements included in caption frames adjacent to the one or more caption frames. In these embodiments, the caption engine determines whether underutilized space exists within an adjacent caption frame by identifying empty strings, [SILENCE] annotations or other indications of media file portions not associated with transcription information generated from affirmative communications recorded within the media file. Next, the caption engine may determine whether the caption system is configured to display indications of underutilized space. If not, the caption engine may shift the begin time or the end time of a caption frame to span the underutilized space identified within the adjacent caption frames. Next, within the act 522, the caption engine stores the caption information and terminates the current process.

In some embodiments, as part of the act 506, if the parser is unable to successfully parse the transcription information, the caption engine assembles each set of sub-elements by applying the maximum caption length and minimum display duration per word or character criteria to tokens included in the transcription information. In such embodiments, the element sequence would be stored as a sequence of transcription tokens, with no POS or hierarchical tree structure information. These embodiments may be implemented with the above parseElement data structure by setting the level, part_of_speech_tag, nextElement and nextLevel fields to NULL.

While the framing process 500 described above walks the parse tree to identify elements to include in element sequences, other embodiments of the framing process 500 iterate through elements stored in a flat, linear data structure, such as a linked list. In these embodiments, each element includes a word and a POS tag associated with the word. Further, according to these embodiments, the framing process 500 applies rules to not break caption frames at certain words based on the POS tag associated with the word. For example, the framing process 500 may apply rules to not break captions between an article and the noun introduced by the article, a preposition and the object of the preposition, a possessive noun and the object possessed, nouns within a compound proper noun, and parts of title. In other embodiments, the framing process 500 may apply rules to preferably break caption frames after particular punctuation marks (e.g., periods, semi-colons, hyphens, commas, etc.).

In one example, during execution of the framing process 500, the caption engine invokes the CollectParseTokens function with the topOfTree parameter set to the first element in the ordered list of elements, the chars_so_far parameter set to 0 and the duration_so_far parameter set to 0. The return value from this invocation would be an ordered list of parseElements that can be placed in the current caption frame, as described above. Subsequently, the caption engine invokes the CollectParseTokens function with the topOfTree parameter set to either another element of the ordered list of elements or to a sub-element of a previous element, in the case where the previous caption frame was completed before the previous element had been completely processed. In the former instance (where the topOfTree parameter was set to a new element), the parameters chars_so_far and duration_so_far would be set appropriately based on the current contents of the current caption frame. In the latter instance (where the topOfTree parameter is set to a sub-element of the current element), a new caption frame would be allocated and the parameters chars_so_far and duration_so_far would be reset to 0.

Processes in accord with the framing process 500 enable caption systems to intelligently parse transcriptions so that grammatical structures included within transcription information are preserved within captions. This preservation of grammatical structures increases readability of these captions over other captions that contain only a part of a phrase due to a break in the caption frame. Such frames are more difficult for the viewer to follow because it requires more effort to retain all the relevant information.

Figure 6:
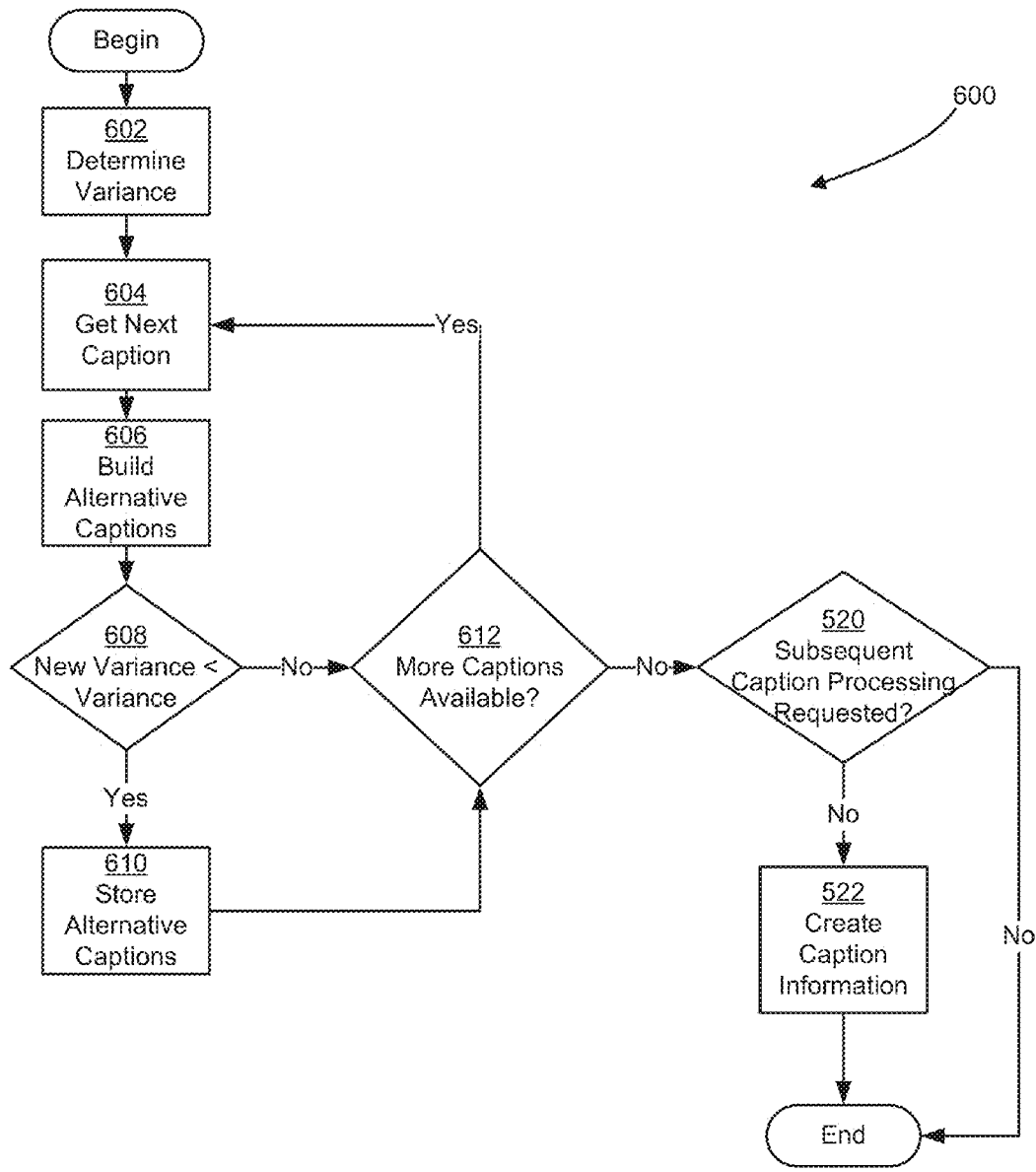
FIG. 6 is a flow diagram illustrating a process for balancing captions.

As discussed above with reference to FIGS. 1 and 4, in some embodiments processes that automatically balance characters or words across a sequence of caption frames are performed using a caption system, such as the caption system 100 described above with reference to FIG. 1. An example of one of these balancing processes is illustrated by FIG. 6. According to this example, the balancing process 600 includes several acts that are described further below.

In act 602, a caption engine, such as the caption engine 132 described above with reference to FIG. 1, determines a value for the variance of a target characteristic of a sequence of caption frames. Examples of target characteristics include words per caption frame, characters per caption frame, and distance of the length of text included in each caption frame from a target length, such as MAX_CAPTION_LENGTH. In some embodiments, the number of caption frames included in the sequence of caption frames is a configurable parameter that is kept to a limited number (i.e., 2 or more) to allow for expedited execution of the balancing process 600. Expedited execution of the process 600 may be particularly useful when the caption system is generating captions in near real-time for streaming media. In these situations, the number of caption frames included in the sequence may be determined as a function of the acceptable delay in producing caption information.

In act 604, the caption engine identifies sub-elements of the elements that are associated with the next caption frame from the set of caption frames. In act 606, the caption engine builds one or more alternatives to the next caption frame and one or more neighboring caption frames using the identified element sequence and element sequences associated with the neighboring caption frames. In one embodiment, a caption frame neighbors another where the caption frames are adjacent to one another within caption information. In another embodiment, the caption engine creates four sets of alternative frames by (1) moving one or more left most elements (or sub-elements where moving the element would violate a criterion and moving the sub-elements would not) from the next caption frame to a caption frame neighboring the next caption frame on the right; (2) moving one or more right most elements (or sub-elements where moving the element would violate a criterion and moving the sub-elements would not) from the next caption frame to a caption frame neighboring the next caption frame on the left; (3) moving one or more right most elements (or sub-elements where moving the element would violate a criterion and moving the sub-elements would not) from a caption frame neighboring the next caption on the left to the next caption frame; and (4) moving one or more left most elements (or sub-elements where moving the element would violate a criterion and moving the sub-elements would not) from a caption frame neighboring the next caption on the right to the next caption frame. In act 608, the caption engine calculates a new value for the variance of the target characteristic assuming that the alternative caption frames are adopted and determines whether the new value is less than the value calculated in the act 602. If so, the caption engine stores the alternative caption frames in act 610. Otherwise, the caption engine determines whether more unprocessed caption frames are available within the set of caption frames in act 612. If so, the caption engine executes the act 604. Otherwise, the caption engine executes a process in accord with the acts 520 and 522 described above with reference to FIG. 5.

In some embodiments, in executing the act 606, the caption engine applies rules to not break caption frames at elements (or sub-elements) associated with one or more POS tags. For example, the caption engine may apply rules to not break caption frames between an article and the noun introduced by the article, a preposition and the object of the preposition, a possessive noun and the object of the possessive noun, nouns within a compound proper noun, and parts of title or an annotation. In other embodiments, the caption engine may apply rules to preferably break caption frames after particular punctuation marks (e.g., period, semi-colon, hyphen, comma, etc.) or after other annotations.

Processes in accord with the balancing process 600 enable caption systems to intelligently parse transcriptions so that information is presented more evenly over a series of captions. An approximate balance in the number of words that appear in successive frames is important for both aesthetic and cognitive processing reasons.

In some embodiments, the processes 500 and 600 are modified to balance text displayed in captions on a per line basis. In at least one of these embodiments, during execution of the processes 500 and 600, the caption engine uses a maximum caption length that equals the maximum caption length divided by a number of lines displayed within a single caption (e.g., 2). Further, in this embodiment during execution of the act 522, the caption engine constructs caption information for a single caption by aggregating a number of caption frames equal to the number of lines displayed within a single caption.

In other embodiments, the processes 500 and 600 are utilized to generate captions in near real-time from streaming media. In these embodiments, the caption engine executes the framing process 500 at sentence boundaries and may not execute the storage action described within the act 522. Further, in these embodiments, the balancing process 600 includes a limited number of caption frames within its balancing window. The number of caption frames included may be determined based on the acceptable latency between receipt of the media and generation of caption information.

Figure 7:
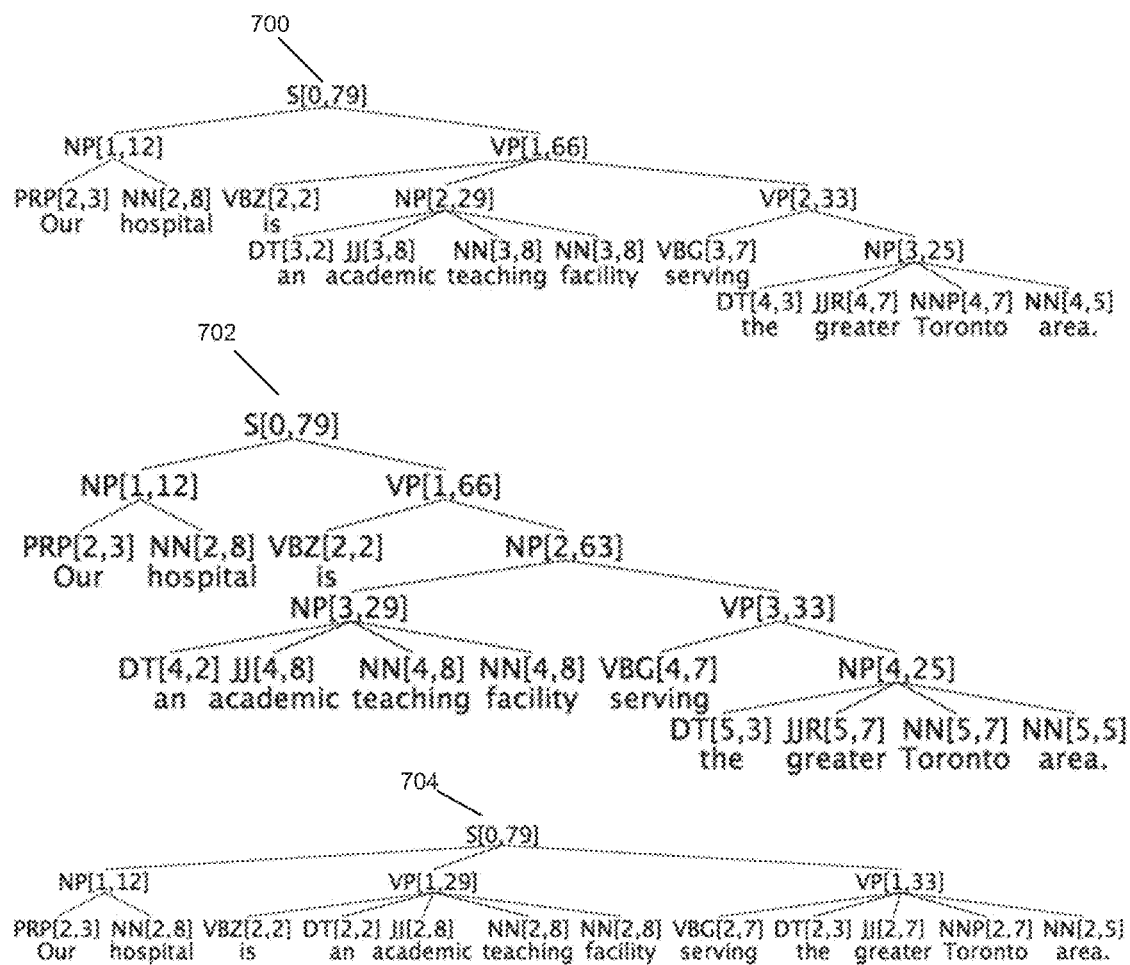
FIG. 7 is an illustration of three parse trees for a sentence processed by a parser.
Figure 8:
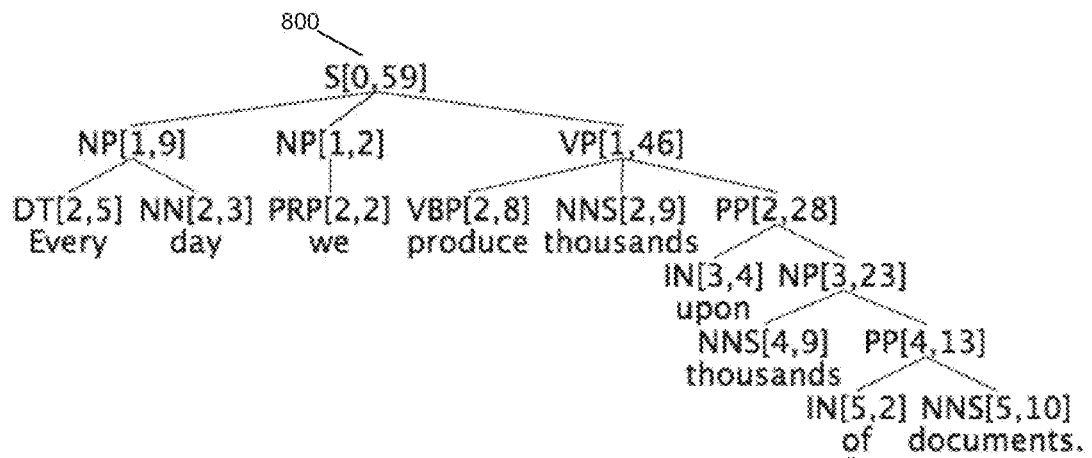
FIG. 8 is an illustration of two parse trees of a sentence processed by a parser.
Figure 8:
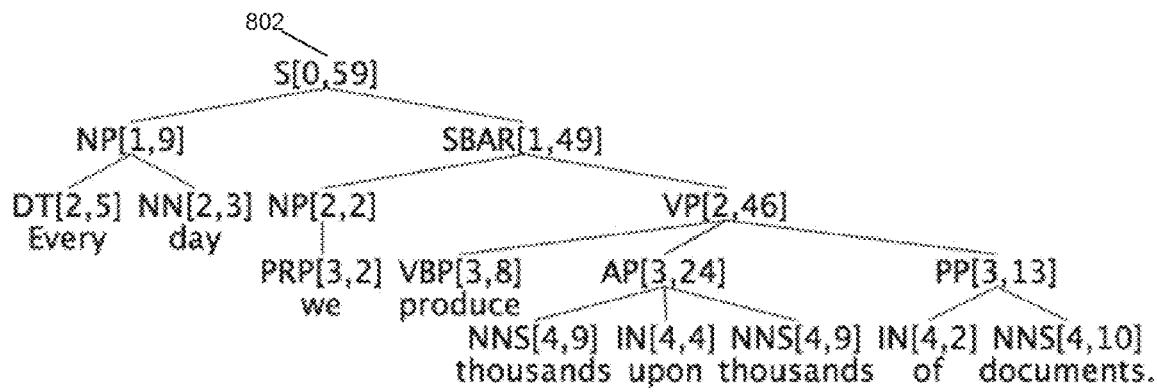

FIGS. 7 and 8 may be used to illustrate the operation of a caption engine, such as the caption engine 132 described above with reference to FIG. 1. FIG. 7 illustrates three parse trees 700, 702, and 704 created for the sentence, "Our hospital is an academic teaching facility serving the greater Toronto area." FIG. 8 illustrates two parse trees 800 and 802 created for the sentence, "Every day we produce thousand upon thousands of documents." Each node of each parse tree illustrates a POS tag associated with an element and a 2-ple indicating the parseLevel and the stringLength of the text (not including boundary spaces) stored within the element.

According to one example, a caption engine, such as the caption engine 132 described above with reference to FIG. 1, executes a framing process, such as the framing process 500 described above with reference to FIG. 5, on transcription information including the sentences diagrammed in FIGS. 7 and 8. In this example, the caption engine reads criteria that specify a maximum caption frame length of 60 characters, a maximum parse level of 2, and no phrase-internal leaves at or above level 2. Next, the caption engine initializes a data structure to hold an element sequence and reads tokens from the transcription information that represent the sentence, "Every day we produce thousand upon thousands of documents."

The caption engine next assembles a new series of tokens from the parse tree 700 that meet the criteria for a caption frame. In this example, the first token series that meets these criteria includes the tokens: NP[1,12], VBZ[2,2], NP[2,29]. Next, the caption engine appends this token sequence to its element sequence. Then the caption engine determines that the token series does not represent the entire sentence, "Every day we produce thousand upon thousands of documents." Responsive to this determination, the caption engine stores the element sequence in the next caption frame, C1. Then the caption engine determines that more tokens are available (i.e., VP[2,33]), re-initializes the element sequence data structure and assembles a new series of tokens including VP[2,33], which is ultimately stored in the next caption frame, C2.

Next, the caption engine reads tokens from the transcription information that represent the sentence, "Our hospital is an academic teaching facility serving the greater Toronto area." The caption engine next assembles a new series of tokens from the parse tree 800 that meet the criteria for a caption frame. In this example, the first token series that meets these criteria includes the token S[0,59]. Next, the caption engine appends this token sequence to its element sequence. Then the caption engine determines that the token series represents the entire sentence, "Our hospital is an academic teaching facility serving the greater Toronto area." Responsive to this determination, the caption engine determines that no more tokens are available for processing and stores the element sequence in the next caption frame, C3.

At this point in this example, the caption engine has produced captions C1, C2, and C3. Next, according to this example, a caption engine executes a balancing process, such as the framing process 600 described above with reference to FIG. 6, using C1, C2, and C3.

As a first act within the balancing process, the caption engine determines the variance in the number of characters between C1, C2, and C3, which equals 172. Next, the caption engine identifies C1 as the next caption frame to be processed. After identifying C1, the caption engine determines that an alternative C2 cannot be produced by moving NP[2,29] from C1 to C2. After making this determination, the caption engine identifies C2 as the next caption frame to be processed. After identifying C1, the caption engine determines that an alternative to C1 cannot be produced by moving VP[2,33] into C1. However, the caption engine determines that an alternative C2 can be produced by moving NP[1,9], which is a sub-element of S[0,59] as stored in C3, into C2. Next, the caption engine determines the variance in the number of characters between C1, alternative C2, and alternative C3, which equals 19. The caption engine next determines that the new variance is less than the old variance. Responsive to making this determination, the caption engine stores alternative C2 as C2 and alternative C3 as C3. Next, the caption engine determines that unprocessed captions exist (i.e. C3). The caption engine next determines that an alternative C3 cannot be produced by moving VP[2,33] from C2 to C3. The caption engine next determines that there is no change in the variance of C1, C2, and C3, that no more captions are available, and ends the balancing process.

In some embodiments, the processes 500 and 600 described above are performed using alternative parse information, such as the alternative parse information illustrated by the parse trees 702, 704, and 802. In these embodiments, the caption system may utilize additional balancing criteria to determine caption information. For example, in one embodiment the caption system calculates, for each set of alternative parse information, a summary that characterizes the level of the nodes associated with the sub-elements appended to element sequences in the act 512. Examples of such summaries include an average level across all captions, an average level across all captions weighted by the length of the text within the captions, a median level across all captions, etc. According to these embodiments, the caption system provides caption information generated from the parse information that results in the lowest summary. Also, in these embodiments, the order in which the alternative parses are considered may be determined by a score, such as a score returned along with the parse tree in a statistical parser. In these embodiments, a score threshold may be set such that parses which do not exceed the threshold are not considered. In this way, more reliable grammatical groupings may be used to seed the framing process 500.

In another embodiment, the caption system calculates, for each set of alternative parse information, a value for the variance of the target characteristic within the population of captions generated by the processes 500 and 600. According to this embodiment, the caption system provides caption information generated from the parse information that results in the lowest variance.

Figure 9:
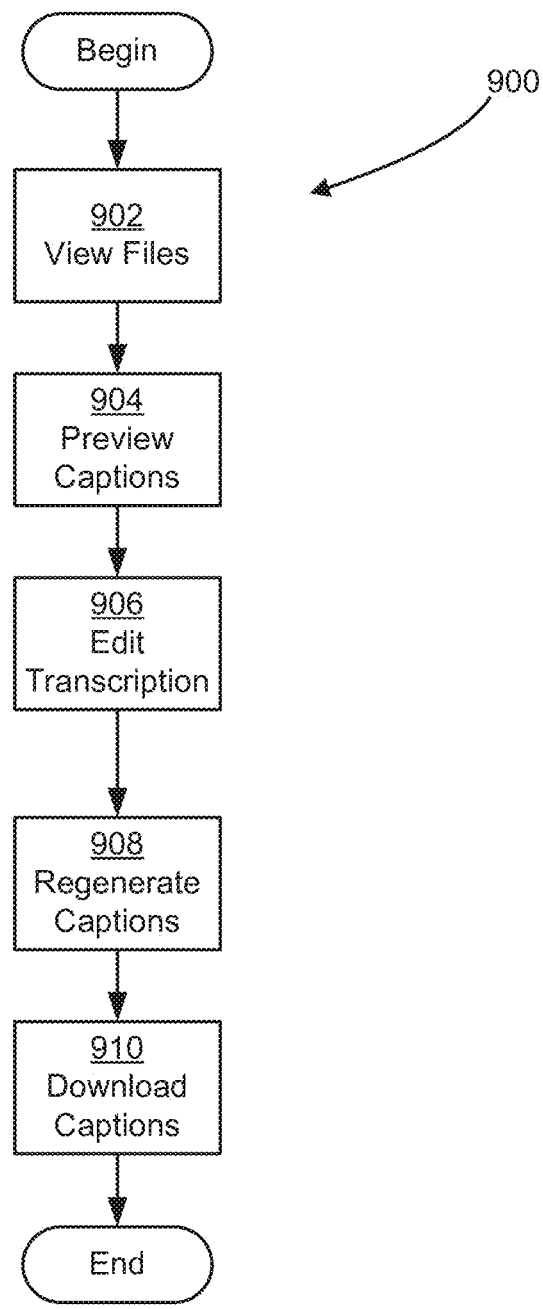
FIG. 9 is a flow diagram illustrating a user process of creating captions.

As discussed above with reference to FIG. 1, in some embodiments processes that enable a customer to create captions are performed using a caption system, such as the caption system 100 described above with reference to FIG. 1. An example of one of these caption creation processes is illustrated by FIG. 9. According to this example, the caption creation process 900 includes several acts that are described further below.

Figure 10:
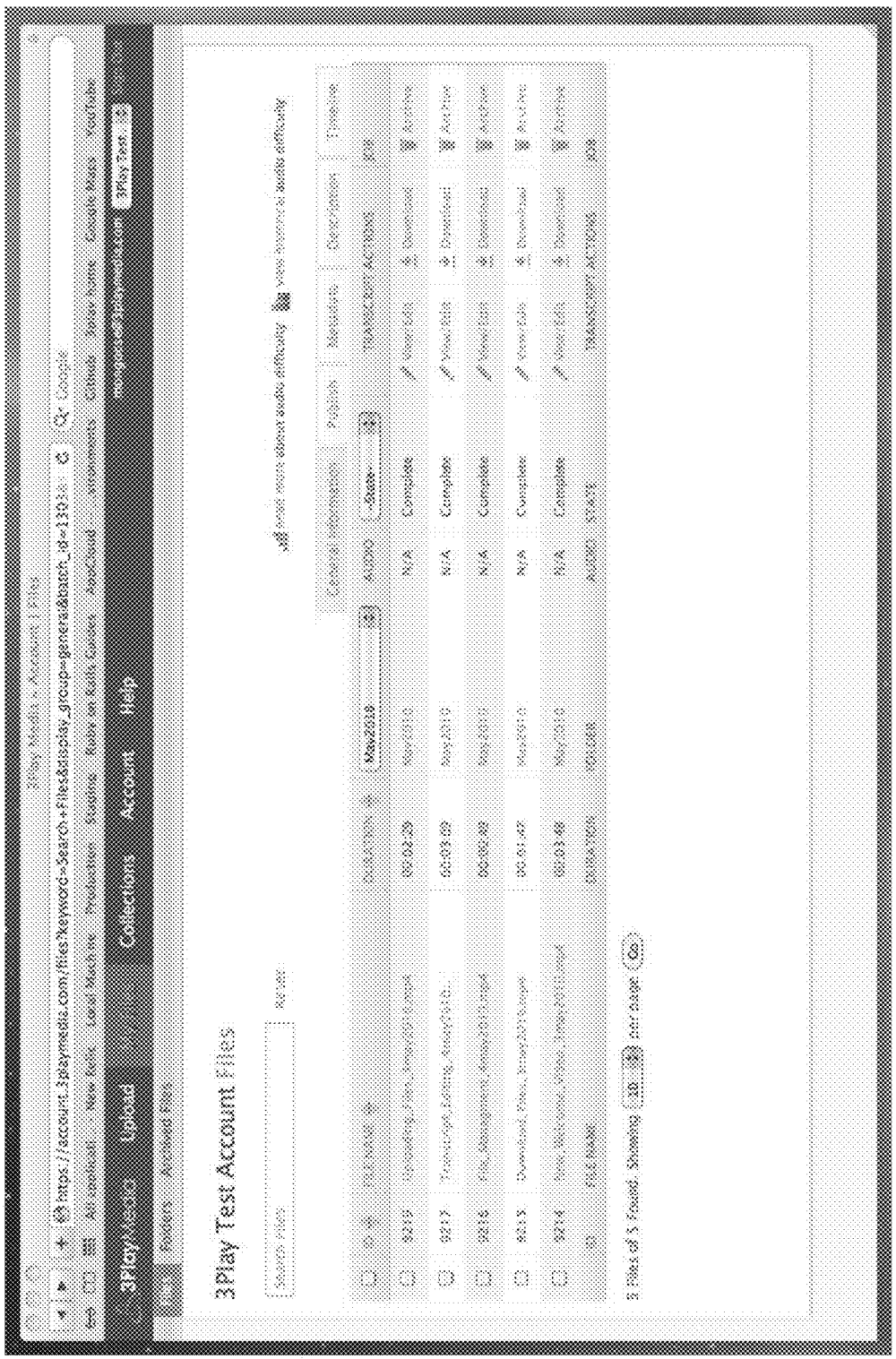
FIG. 10 is an illustration of a user interface screen provided by a caption system.
Figure 11:
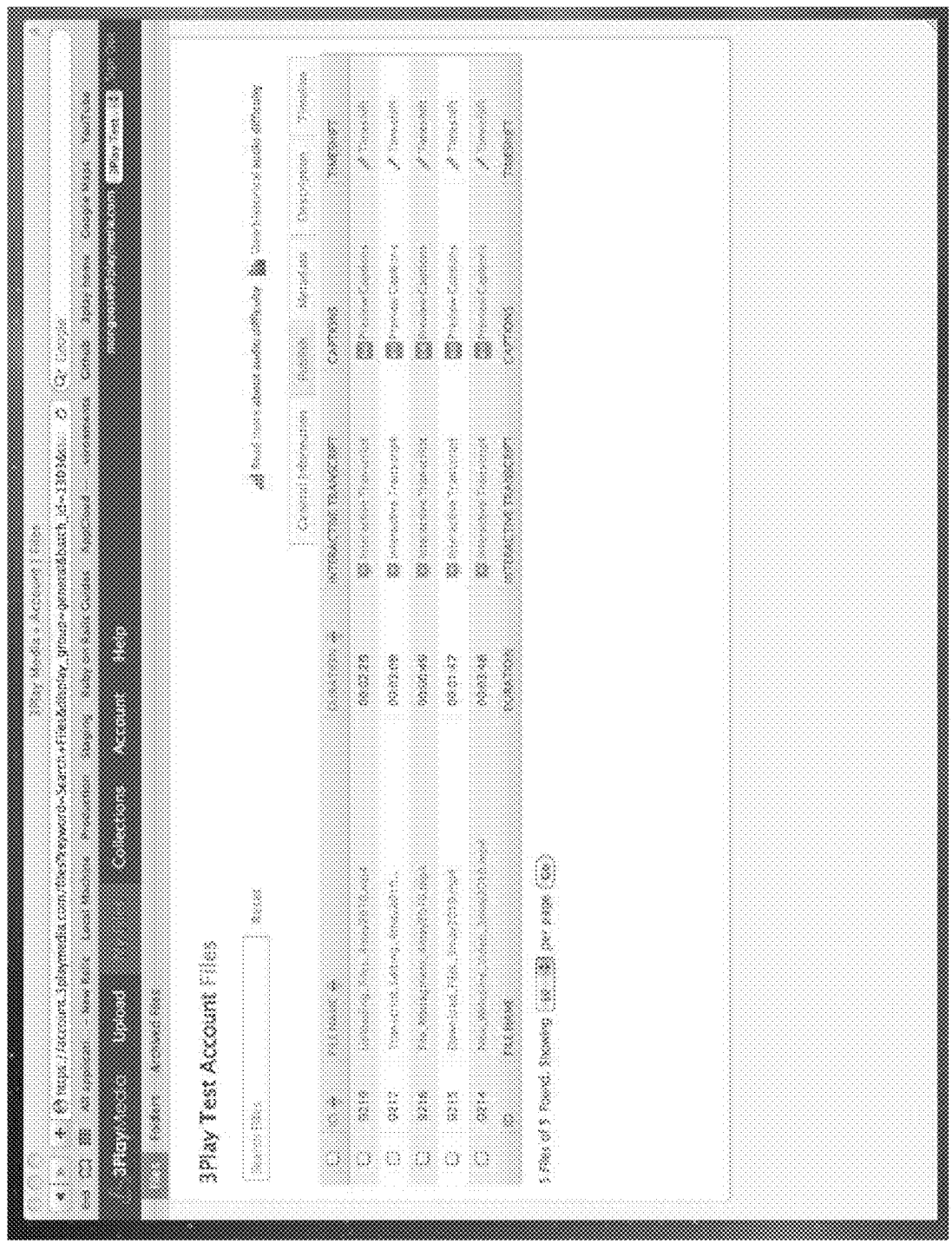
FIG. 11 is an illustration of another user interface screen provided by a caption system.

In act 902, a customer interface, such as the customer interface 124 described above with reference to FIG. 1, presents a user interface screen that provides media file, transcription, and caption information to a customer, such as the customer 110 described above with reference to FIG. 1, via a client computer, such as the client computer 104 described above with reference to FIG. 1. FIG. 10 illustrates one example of a user interface screen presented as part of the act 902. Next, as part of the act 902, the customer interface receives an indication from the user interface that the "Publish" tab has been actuated. Responsive to receiving the indication that the "Publish" tab has been actuated, the customer interface presents a user interface screen that provides publication options. FIG. 11 illustrates one example of a user interface screen presented as part of the act 902. Next, as part of the act 902, the customer interface receives an indication from the user interface that the "Preview Captions" link has been actuated.

Figure 12:
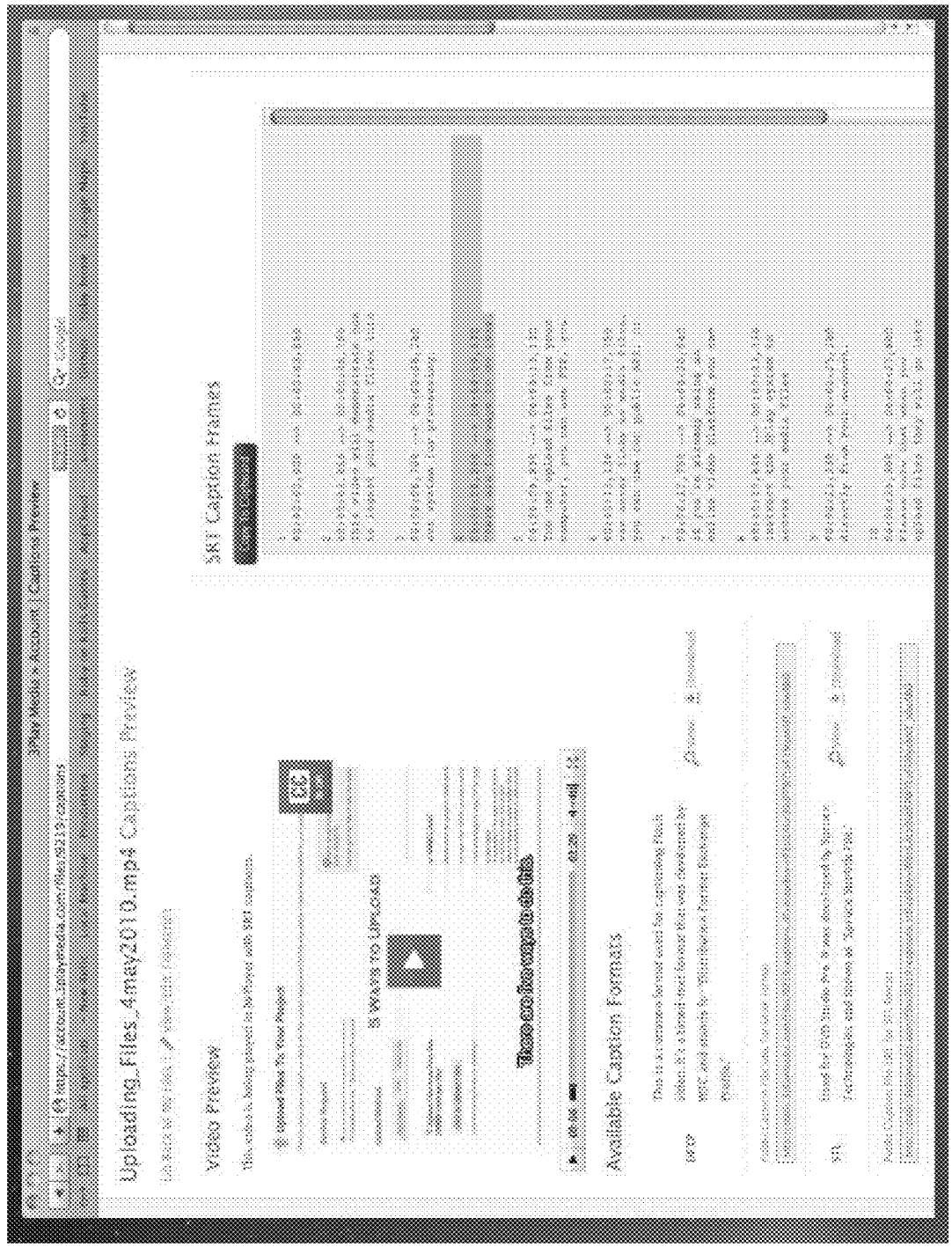
FIG. 12 is an illustration of another user interface screen provided by a caption system.

In act 904, responsive to receiving the indication that the "Preview Captions" link has been actuated, the customer interface requests execution of the acts 406-410 and presents a user interface screen that provides available caption formats and previews of the media file in association with captions. FIG. 12 illustrates one example of a user interface screen presented as part of the act 904. Next, as part of the act 904, the customer interface receives an indication from the user interface that the "Go Back to My Files" link has been actuated. Responsive to receiving the indication that the "Go Back to My Files" link has been actuated, the customer interface presents a user interface screen such as the user interface screen illustrated in FIG. 10. Next, the customer interface receives an indication from the user interface that the "View/Edit" link for a particular file has been actuated.

Figure 13:
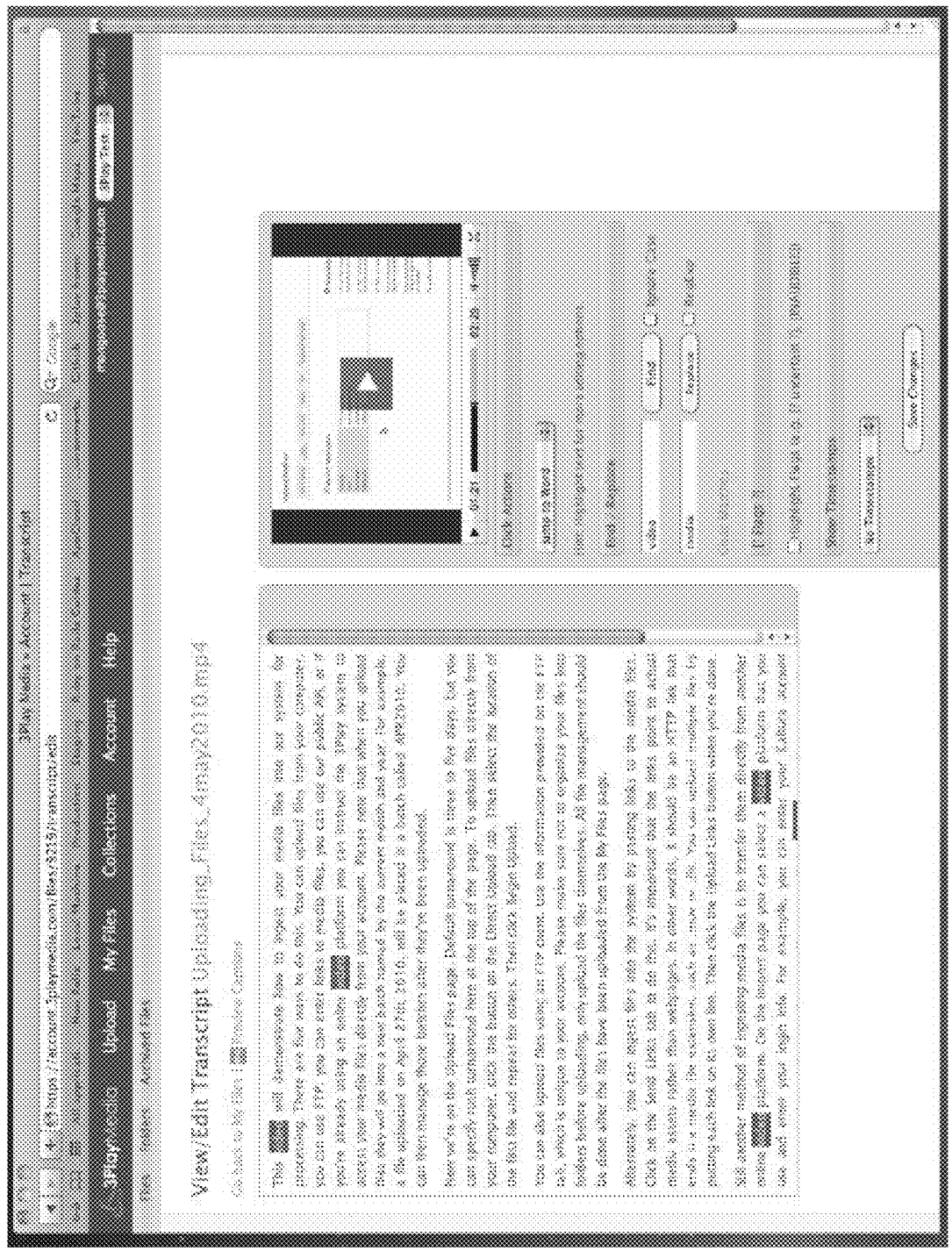
FIG. 13 is an illustration of another user interface screen provided by a caption system.
Figure 14:
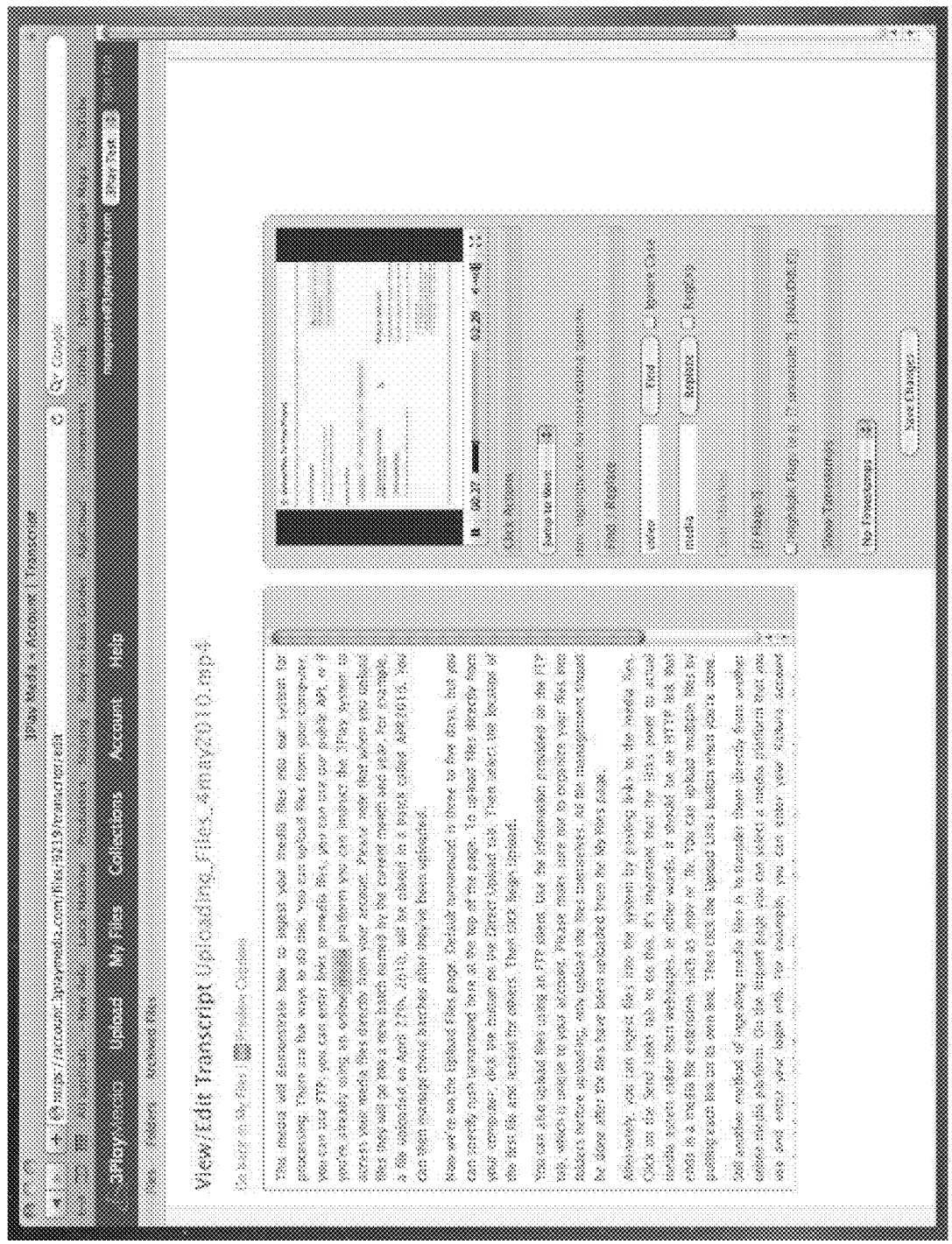
FIG. 14 is an illustration of another user interface screen provided by a caption system.

In act 906, responsive to receiving the indication that the "View/Edit" link has been actuated, the customer interface presents a user interface screen through which the customer interface receives edits to transcription information. FIG. 13 illustrates one example of a user interface screen presented as part of the act 906. Next, as part of the act 906, the customer interface receives an indication from the user interface that the word "video" should be replaced with the word "media" in the transcription information. Responsive to receiving this indication, the customer interface performs the replacement and displays a screen in accord with FIG. 14. Next, the customer interface receives an indication from the user interface that the "Save Changes" button has been actuated. Responsive to receiving this indication, the customer interface saves the changes to the transcription information that will be used as input to the caption engine. Next, the customer interface receives an indication from the user interface that the "Go Back to My Files" link has been actuated. Responsive to receiving the indication that the "Go Back to My Files" link has been actuated, the customer interface presents a user interface screen such as the user interface screen illustrated in FIG. 10.

Next, as part of the act 906, the customer interface receives an indication from the user interface that the "Publish" tab has been actuated. Responsive to receiving the indication that the "Publish" tab has been actuated, the customer interface presents a user interface screen in accord with FIG. 11. Next, the customer interface receives an indication from the user interface that the "Preview Captions" link has been actuated.

Figure 15:
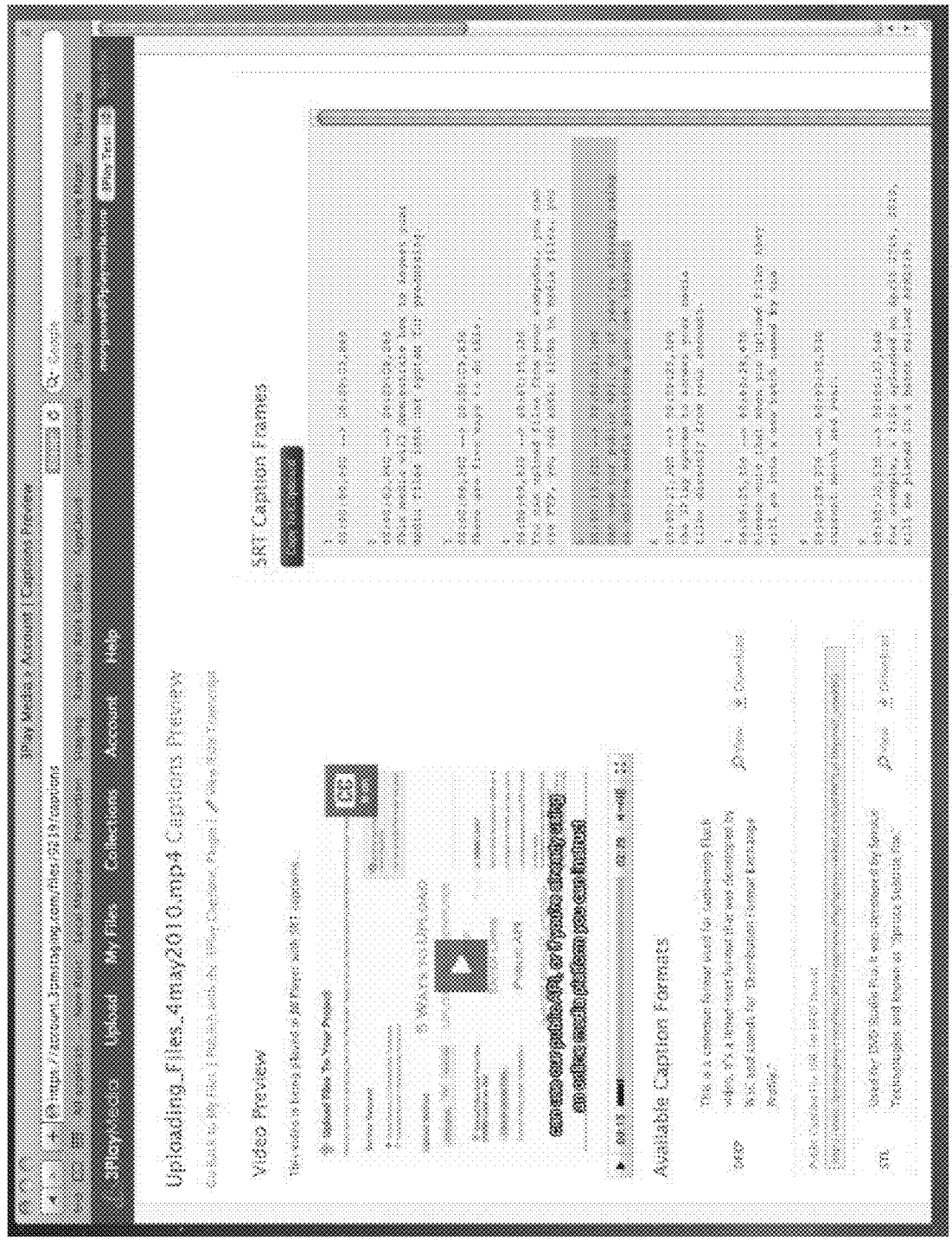
FIG. 15 is an illustration of another user interface screen provided by a caption system.

In act 908, responsive to receiving the indication that "Preview Captions" link has been actuated, the customer interface requests that the caption engine regenerate captions reflecting the previous made edits (e.g., requests execution of the acts 406-410, and optionally 406-414) and provides a user interface screen that presents regenerated captions. FIG. 15 illustrates one example of a user interface screen presented as part of the act 908. Next, the customer interface receives an indication from the user interface that the "Go Back to My Files" link has been actuated. Responsive to receiving the indication that the "Go Back to My Files" link has been actuated, the customer interface presents a user interface screen such as the user interface screen illustrated in FIG. 10. Next, the customer interface receives an indication from the user interface that the "Download" link has been actuated.

Figure 16:
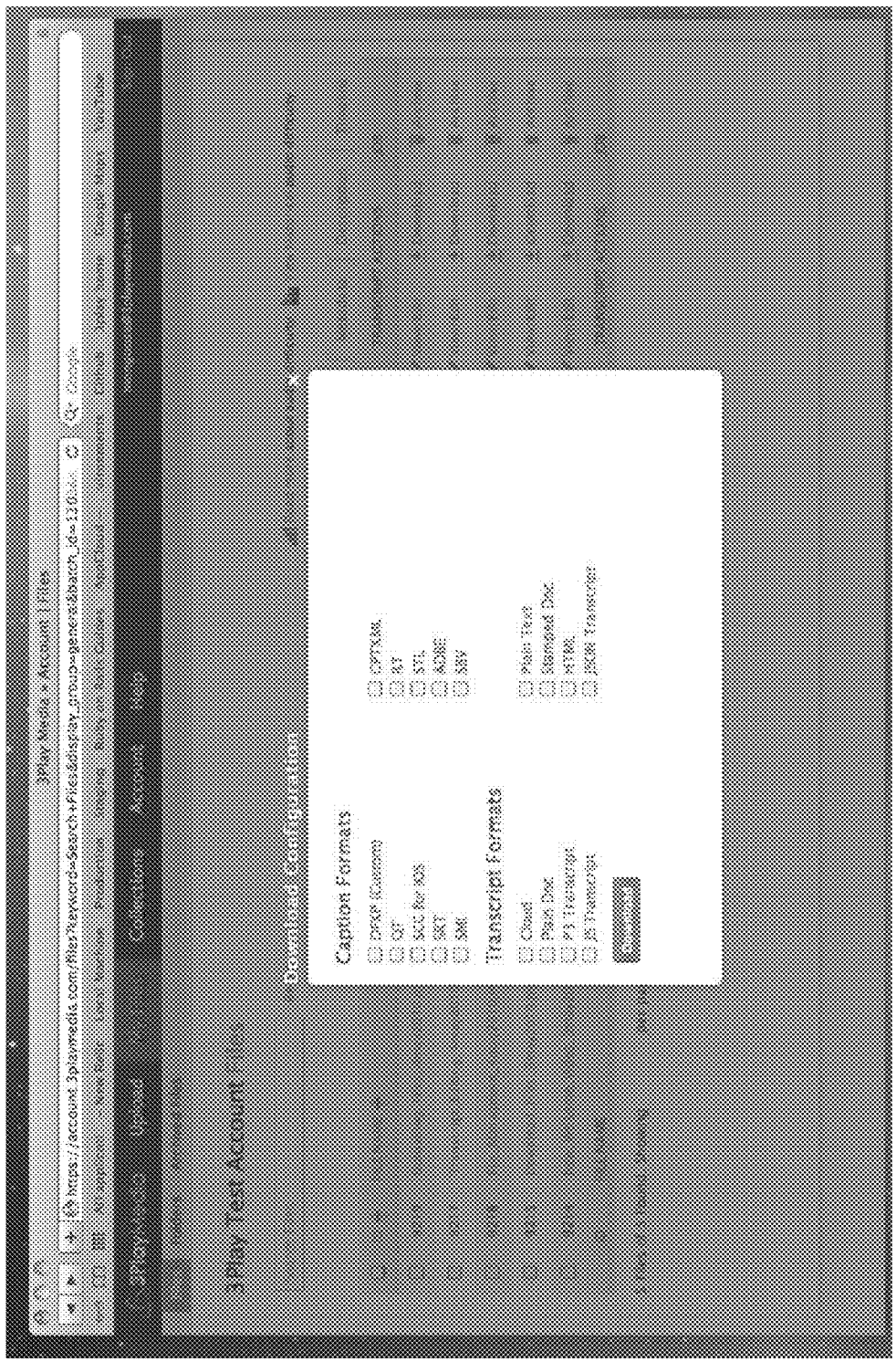
FIG. 16 is an illustration of another user interface screen provided by a caption system.

In act 910, responsive to receiving the indication that "Download" link has been actuated, the customer interface provides a user interface screen that presents the caption formats in which the regenerated caption information is available for download. FIG. 16 illustrates one example of a user interface screen presented as part of the act 910. Next, the customer interface receives an indication from the user interface that a format check box and the download button have been actuated. Responsive to receiving this indication, the customer interface downloads the regenerated captions in the selected format to the client computer.

Processes in accord with the caption creation process 900 enable caption systems to provide highly readable caption information for transcription information edited by a customer, without requiring costly and time consuming manual caption generation activities. Moreover, such processes embody an appreciation that customers may also wish to have flexibility in caption formatting, so that they can experiment with these tradeoffs in order to optimize the viewing/listening experience. In addition, applications for automatic regeneration of captions in various formats include modern video players which are becoming increasingly configurable. Each configuration imposes distinct constraints on the caption format. For example, as a user changes the window size of his/her video player, the existing captions may no longer fit on the screen. Or if the user increases the playback speed, the captions may be difficult to read. Processes in accord with the caption creation process 900 provide the flexibility required to accommodate these situations.

Figure 17:
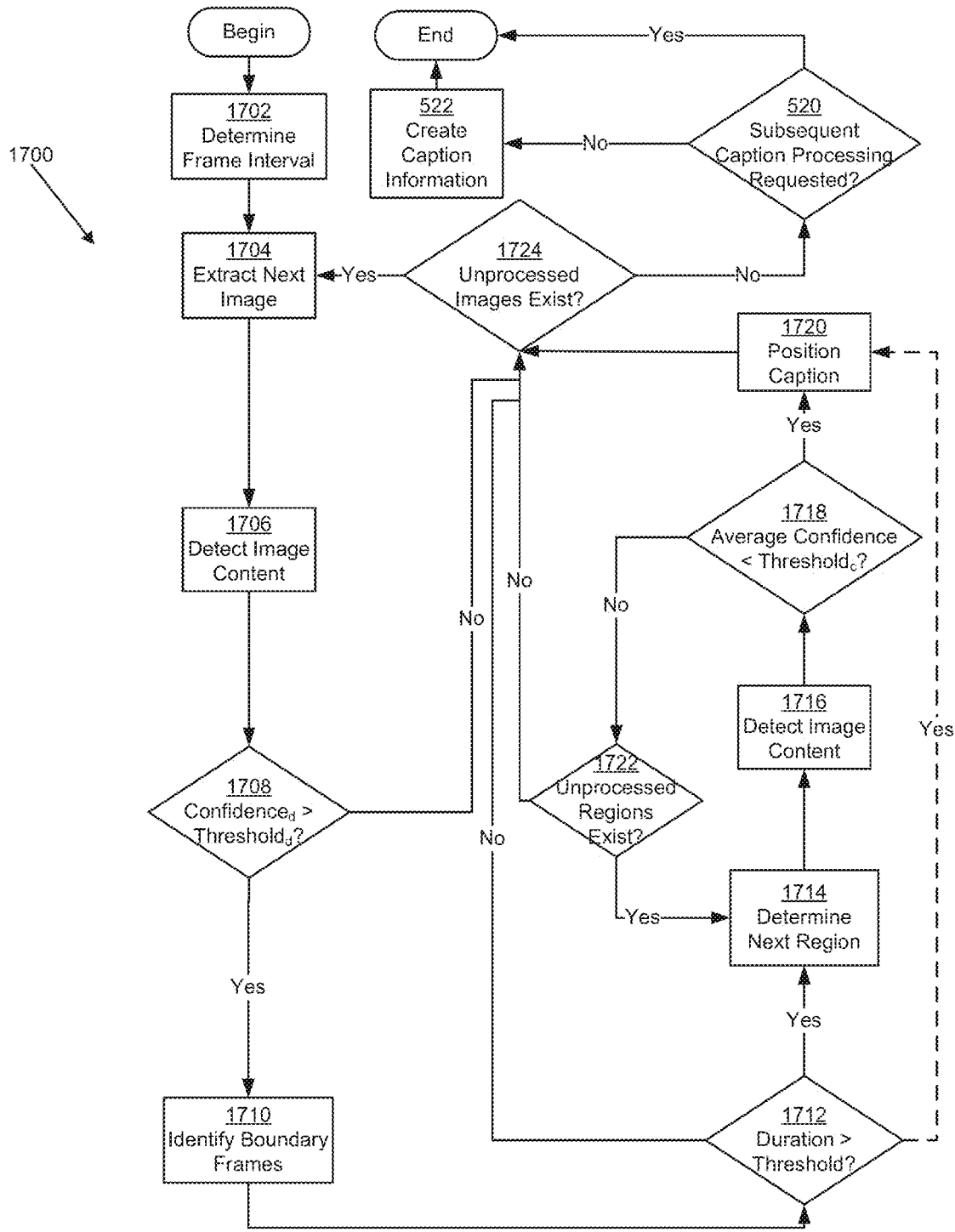
FIG. 17 is a flow diagram illustrating a process for positioning captions.

As discussed above with reference to FIGS. 1 and 4, in some embodiments processes that automatically position caption frames are executed by a caption system, such as the caption system 100 described above with reference to FIG. 1. An example of one of these positioning processes is illustrated in FIG. 17. According to this example, the positioning process 1700 includes several acts that are described further below.

In act 1702, a caption engine, such as the caption engine 132 described above with reference to FIG. 1, reads a configurable parameter that specifies a frame interval used as a basis for iterating through the video frames included in a media file. In one embodiment, this frame interval configurable parameter has a stored value of 6, which indicates that the caption engine will iterate through the video frames of the media file in quarter second intervals, where the frame rate is 24 frames/second. In other embodiments, the frame interval configurable parameter has other stored values. For instance, according to one embodiment, the frame interval configurable parameter has a stored value of 1. In another embodiment, the frame interval includes a sequence of discrete values that are based on overall image discontinuities (e.g., keyframe data). In this embodiment, the frame interval may itself iterate through the sequence of discrete values, thereby increasing efficiency by configuring the caption engine to target its processing on video frames including the image discontinuities.

In act 1704, the caption engine identifies a target video frame by iterating to the next video frame according to the stored value of the frame interval configurable parameter. The caption engine next determines whether a caption frame is associated with (e.g., is to be superimposed on) the target video frame. If not, the caption engine skips the target video frame by re-executing the act 1704. Otherwise, the caption engine next determines whether the caption frame associated with the target video frame includes no caption text. If so, the caption engine skips the target video frame by re-executing the act 1704. Otherwise, the target video frame has an associated caption frame that includes caption text, and the caption engine extracts an image from the video frame.

In the act 1706, the caption engine attempts to detect identified content within a default region of the image. In some embodiments, the caption engine calculates the dimensions of the default region using the caption text of the caption frame associated the video frame from which the image was extracted in the act 1704. These dimensions may be vertical only, horizontal only, or both vertical and horizontal. Further, in these embodiments, the caption engine adjusts the dimensions of the default region using the font size and style, which are customer-specific configurable parameters.

In one particular example, a caption frame may contain the text:

Lower and uppercase letters
are considered the same.

According to this example, the caption engine calculates the dimensions of the default region according to a region calculation process defined by the following pseudo-code:

Configurable pixel-size of an image extracted from a video frame in the media file:
HEIGHT=180
WIDTH=320
Configurable fraction from top of video frame where first line of caption text starts
CAPTION_START_FRACTION=0.75
Configurable font metrics of caption text
CAPTION_FONT_HEIGHT=10
This includes inter-character spacing:
CAPTION_FONT_WIDTH=8
CAPTION_FONT_LINE_SEPARATION=2
top_of_text=height*CAPTION_START_FRACTION
first_line_length="Lower and uppercase letters".length
second_line_length="are considered the same.".length
n_lines=(first_length_length>0) ? 1:0
n_lines+=(second_length>0) ? 1:0
bottom_of_text=top_of_text+
(n_lines*CAPTION_FONT_HEIGHT)+((n_lines−1)*CAPTION_FONT_LINE_SEPARATION)
max_line_length=max(first_line_length, second_line_length)
middle_of_frame=WIDTH/2
horizontal_excursion=CAPTION_FONT_WIDTH*(max_line_length/2)
Here, we assume caption text is centered:
left_of_text=middle_of_frame−horizontal_excursion
right_of_text=middle_of_frame+horizontal_excursion
This is the conservative bounding box to search for on-frame text:
return [top_of_text, left_of_text, bottom_of_text, right_of_text]

So, in this example, the caption engine would calculate the dimensions of the default region as [135, 52, 157, 268].

The region calculation process described by the pseudo code listing above may be altered as follows. In one embodiment, the region calculation process uses a constant value for the number of lines in each caption frame, e.g. 2. In another embodiment, the region calculation process uses a constant value for the number of characters per line in the each line of caption text, e.g. 32. In another embodiment, the region calculation process calculates a non-rectangular search region based on the actual lengths of each line. In another embodiment, the region calculation process uses a constant value for the starting x-location (e.g., a configurable parameter that is a fraction across the width of the image) and calculates the end location of each line of caption text by adding the full line length of the line to the starting x-location, thereby causing the default region to reflect left justified caption text.

In some embodiments within the act 1706, the caption engine attempts to detect in-image text or other identified content (e.g., visual information) within the default region of the image by processing the default region with a text detector. In these embodiments, the text detector determines whether the default region (e.g. a rectangular bounding box) in the image contains text and may optionally include a confidence$_d$ (for example, a value between 0 and 1) that the default region contains text. In some embodiments, the text detector additionally returns the y pixel location that is the most likely y-location of the text in each region. For example, if the text detector determines that the default region [120, 80, 240, 100] (representing the pixel locations: upper-left-x, upper-left-y, lower-right-x, lower-right-y of the bounding box) contains text with 0.85 confidence, it may also indicate that pixel location 92 is the row of the region that is most likely to contain text.

In act 1708, the caption engine determines whether identified content was detected in the default region of the image (e.g., whether the text detector detected text in the default region or the confidence$_d$ exceeds a value of a configurable parameter, threshold$_d$). The value of threshold$_d$ specifies the confidence required for the caption engine to determine that identified content exists within the default region. If the caption engine determines that identified content was detected in the default region (e.g., that the text detector detected text in the default region or the confidence$_d$ exceeds a value of threshold$_d$), the caption engine executes act 1710. Otherwise, the caption engine executes act 1724.

In the act 1710, the caption engine identifies a series of consecutive video frames that includes the target video frame and in which each video frame meets a set of search criteria. This search criteria may specify that each video frame be associated with a caption frame to be superimposed on the video frame and that each video frame include an image having identified content within its default region. In some embodiments, the caption engine identifies adjacent frames on each side of the target video frame until text is no longer detected in the default region or until the text detection confidence is below a threshold that is a configurable parameter. The goal of the act 1710 is to determine the time extent of the identified content within the default region.

In some embodiments, during execution of the act 1710, the caption engine reads a value of a configurable parameter, MAXIMUM_SEARCH. In these embodiments, the caption engine terminates searching for consecutive video frames where the number of consecutive video frames equals the value of MAXIMUM_SEARCH. The value of MAXIMUM_SEARCH may default to 24, i.e. 1 second of duration for a video recorded at 24 frames-per-second frame rate.

In other embodiments, during execution of the act 1710, the caption engine reads a value of a configurable parameter, PIXEL_LEEWAY. In these embodiments the caption engine terminates searching for consecutive video frames where a current value of the horizontal pixel row that is most likely to contain text in the default region differs from the most recently recorded value by more than the value of PIXEL_LEEWAY. For example, the caption engine may stop searching for consecutive video frames if the most likely row in the current image differs from the most likely row in the previous image by more than 3. This technique may additionally help reduce false positives from the text detection algorithm.

According to one example, the caption engine identifies boundary frames according to a boundary identification process defined by the following pseudo-code:

```
MAXIMUM_SEARCH=24
CONFIDENCE_THRESHOLD=0.8
# How far we let the maximum horizontal pixel location
differ across the text extent:
    PIXEL_LEEWAY=3
# Do we allow the maximum horizontal pixel location to
be updated at each frame?
    ALLOW_PIXEL_DRIFT=TRUE
# number of frames which we can skip over in text-extent
    search:
MAX_FRAME_MISS=1
def   search_for_text_extent(initial_video_frame, initial_pixel_location, bounding_box):
    save_initial_pixel_location=initial_pixel_location;
    last_frame_with_text=initial_video_frame;
    left_frame=initial_video_frame-1;
    last_frame_with_text=initial_video_frame;
    while (left_frame>initial_video_frame-MAXIMUM_
        SEARCH) {
      (text_detected_boolean, text_confidence, text_max_
        pixel)=detect_text(left_frame, bounding_box);
      if      (text_detect_boolean==TRUE       &&
        text_confidence>CONFIDENCE_
        THRESHOLD  &&   abs(text_max_pixel-initial_pixel_location)<=PIXEL_LEEWAY) {
        last_frame_with_text=left_frame;
        if (ALLOW_PIXEL_DRIFT==TRUE) {
          # Update the maximum pixel location, to allow
            "drift"
          initial_pixel_location=text_max_pixel
        }
      elsif   ((last_frame_with_text-left_frame)>MAX_
        FRAME_MISS) {
        # left text extent reached
        break;
      }
      left_frame=left_frame-1
    } # End of while loop searching for left extent of text
    right_frame=initial_video_frame+1
    initial_pixel_location=save_initial_pixel_location
    last_frame_with_text=initial_video_frame;
    while  (right_frame<initial_video_frame+MAXIMUM_
        SEARCH) {
      (text_detected_boolean, text_confidence, text_max_
        pixel)=detect_text(right_frame, bounding_box);
      if        (text_detect_boolean==TRUE        &&
        text_confidence>CONFIDENCE_THRESHOLD
        &&    abs(text_max_pixel-initial_pixel_location)
        <=PIXEL_LEEWAY) {
        last_frame_with_text=right_frame;
        if (ALLOW_PIXEL_DRIFT==TRUE) {
          # Update the maximum pixel location, to allow
            "drift"
          initial_pixel_location=text_max_pixel
        }
      elsif     ((right_frame-last_frame_with_text)>MAX_
        FRAME_MISS) {
        # right text extent reached
        break;
      }
      right_frame=right_frame-1
    } # End of while loop searching for right extent of text
    return (left_frame, right_frame)
} # End of search_for_text
```

It is appreciated that, in the pseudo code listing above, there is an optimization of skipping the call to "detect_text" for frames that were already processed in earlier stages. The (text_detected_boolean, text_confidence, text_max_pixel) may be stored temporarily in memory in association with the video frame index and thus retrieved in this optimized embodiment.

In act 1712, the caption engine determines whether the display duration of the identified content within the default region is sufficient to warrant moving caption frames from the default region. In some embodiments, the caption engine makes this determination by comparing the number of consecutive video frames identified above in the act 1710, or a period of time the consecutive video frames are displayed during playback, to a value of a display threshold that is a configurable parameter. Example values of this display threshold include 0.25 seconds or 6 frames at a 24 frames-per-second frame rate. If the display duration exceeds the value of the display threshold, the caption engine executes act 1714. Otherwise, the caption engine executes the act 1724.

In the act 1714, the caption engine determines a next region of the image that is a candidate for caption text superimposition. In some embodiments, the caption engine makes this determination by reading the next member of a set of candidate regions that are defined by a configurable parameter. This set of candidate regions may include one or more members.

In act 1716, the caption engine attempts to detect identified content within the default and the candidate regions of a series of images from video frames to be displayed during the time extent of the caption frame as determined, for example, with reference to the begin time of the earliest element in the caption frame and the end time of the latest element in the caption frame. The series of images may be a series of consecutive images. In some embodiments, the caption engine executes acts related to the candidate regions that are analogous to those described above in the act 1706 for the default region. However, in at least one embodiment, the caption engine adjusts the location of candidate regions within each image by, for example, changing the value of the CAPTION_START_FRACTION to 0.25 during execution of the region calculation process described above in the act 1706. In this embodiment, the horizontal extent of the candidate region will be constrained identically as for the default region, based on the geometry of the caption text of the caption frame. In some embodiments, within the act 1716, the caption engine attempts to detect identified content by iterating through the series of images and, for each image, processing the default and candidate regions with a text detector and storing the results.

In act 1718, the caption engine determines whether identified content was detected in the candidate regions of the images (e.g., whether the text detector detected text in the candidate regions or the average confidence of text in the candidate regions exceeds a value of a configurable parameter, $threshold_c$). The value of $threshold_c$ specifies the confidence required for the caption engine to determine that identified content exists within the candidate regions. In one embodiment, the value of $threshold_c$ is set to be the average confidence of text detected in the default regions. If the caption engine determines that identified content was not detected in the candidate regions (e.g., that the text detector did not detect text in the candidate regions or the average confidence of the text in the candidate regions is less than a value of threshold), the caption engine executes act 1720. Otherwise, the caption engine executes act 1722.

In the act 1720, the caption engine moves the caption frame from the default regions to the candidate regions by storing position information in the caption frame that identifies the candidate regions. In some embodiments, this position information is encoded as an XY raster location within the video frames where the upper-left corner of the caption text is to be displayed. In other embodiments, the position information may be encoded as a generalized location (e.g. bottom, top, left, right, upper-right, etc.) to allow flexibility when the caption frames are converted to certain playable caption formats.

In the act 1722, the caption engine determines whether unprocessed candidate regions exist within the set of candidate regions. If so, the caption engine executes the act 1714. Otherwise, the caption engine executes the act 1724.

In the act 1724, the caption engine determines whether unprocessed images exist within the media file. If so, the caption engine executes the act 1704. Otherwise, the caption engine has processed all of the video frames in the media file and executes a process in accord with the acts 520 and 522 described above with reference to FIG. 5. Upon termination of the caption positioning process 1700, each of the caption frames associated with the media file includes automatically generated or verified position information.

In some embodiments, the caption engine is configured to read a value of a configurable parameter that indicates whether a media file is a proxy file used for distribution of the media file prior to making the media file available to the general public. When executing according to this configuration, the caption engine executes an adjusted version of the caption positioning process 1700 in which the caption engine proceeds from the act 1712 directly to the act 1720 where the display duration exceeds the value of the display threshold. Further, in this embodiment within the act 1720, the caption engine determines a candidate region to which to move the caption frame by reading the first member of the set of candidate regions defined by the configurable parameter described above with reference to the act 1714.

This embodiment manifests an appreciation that many proxy files have burned in time-code indicators at the top of each video frame, and would therefore be likely to have a high confidence at step 1718. By proceeding from the act 1712 directly to the act 1720, but still providing the candidate region to which to move the caption frame, the caption engine is able to function efficiently in the presence of other content (e.g., visual elements such as burned in time-code).

In some embodiments, the text detector may be replaced by, or used in conjunction with, other image processing components, such as an object detector or a face detector, that detect other identified content (e.g., visual information) that may be present in an identified region of an image. In these and other embodiments, the text detector, object detector (e.g., a detector based on an edge detection process), or facial detector (e.g., a detector based on a Viola-Jones process) need not identify the precise text, foreground object, or face in the region, only that the text, foreground object, or face may be present, and optionally with a given confidence value or maximum horizontal pixel location.

Processes in accord with the caption positioning process 1700 enable caption systems to provide captions that are positioned to not interfere with other identified content displayed during playback of a media file, without requiring costly and time consuming manual caption placement activities.

Figure 18:
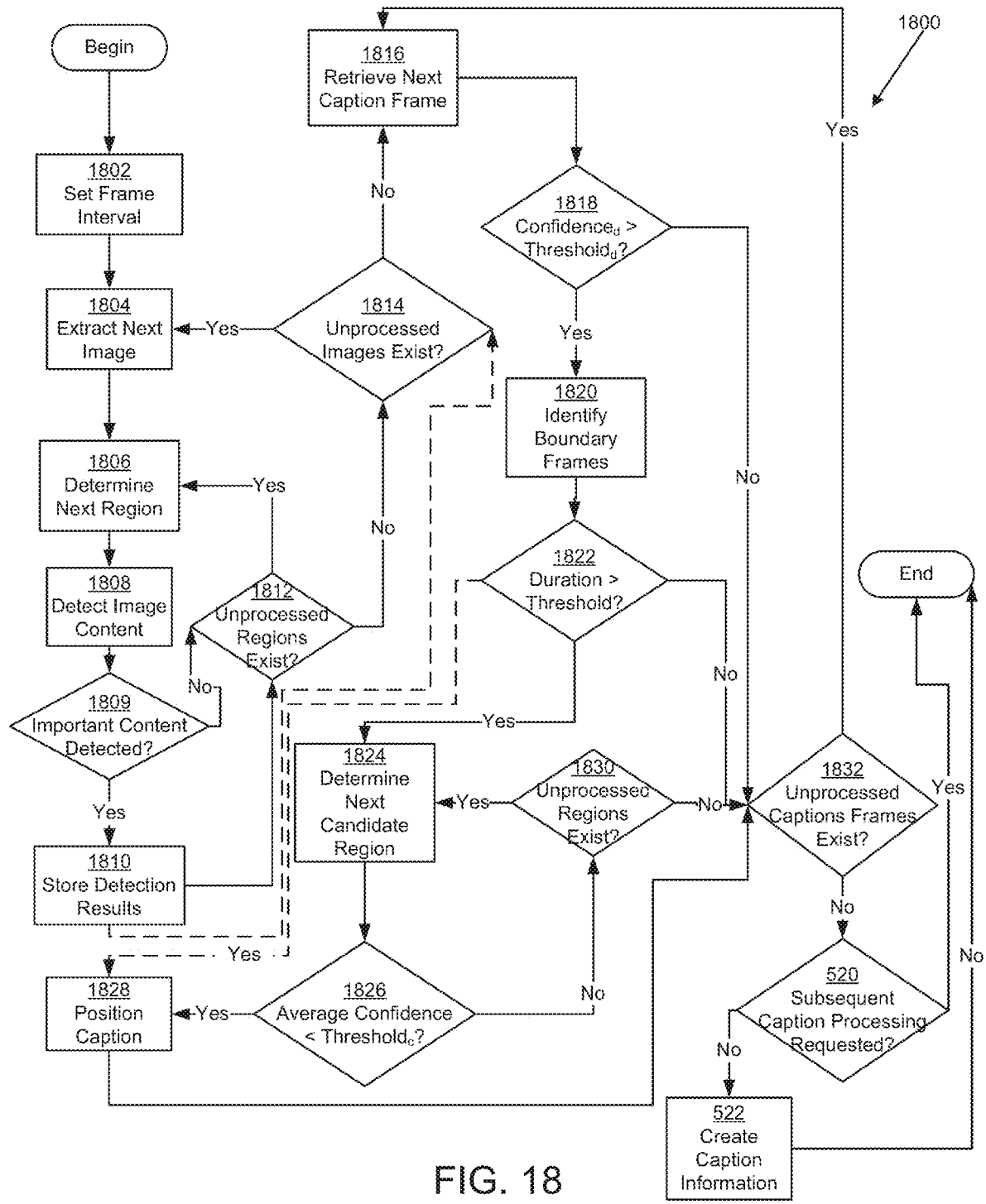
FIG. 18 is a flow diagram illustrating a process for positioning captions.

As discussed above with reference to FIGS. 1 and 4, in some embodiments processes that automatically position caption frames are executed by a caption system, such as the caption system 100 described above with reference to FIG. 1. Another example of one of these positioning processes is illustrated in FIG. 18. According to this example, the positioning process 1800 includes several acts that are described further below.

In act 1802, a caption engine, such as the caption engine 132 described above with reference to FIG. 1, reads a configurable parameter that specifies a frame interval used as a basis for iterating through the video frames included in a media file. In one embodiment, this frame interval configurable parameter has a stored value of 1, which indicates that the caption engine will iterate through each video frame in the media file. In another embodiment, the frame interval includes a sequence of discrete values that are based on overall image discontinuities (e.g., keyframe data). In this embodiment, the frame interval may itself iterate through the sequence of discrete values, thereby increasing efficiency by configuring the caption engine to target its processing on video frames including the image discontinuities.

In act 1804, the caption engine iterates to the next video frame according to the stored value of the frame interval configurable parameter, identifies the next video frame as a target video frame, and extracts an image from the video frame.

In the act 1806, the caption engine determines a target region of the image that is a candidate for caption text superimposition. In some embodiments, the caption engine determines the target region as being the next member read from a set of potential regions that are defined by a configurable parameter. This set of potential regions may include one or more members, such as a default region and one or more candidate regions.

In the act 1808, the caption engine attempts to detect identified content within the target region of the image. In some embodiments, the caption engine uses conservatively large dimensions (e.g., large enough to encompass 2 lines of text both filled with 32 characters) for the target region to ensure that the vast majority or all of the caption text will fit within the target region. These dimensions may be vertical only, horizontal only, or both vertical and horizontal. Further, in these embodiments, the caption engine adjusts the dimensions of the target region using the font size and style, which are customer-specific configurable parameters.

In some embodiments within the act 1808, the caption engine attempts to detect in-image text or other identified content (e.g., visual information) within the target region of the image by processing the target region with a text detector. In these embodiments, the text detector determines whether the target region (e.g. a rectangular bounding box) in the image contains text and may optionally include a confidence (for example, a value between 0 and 1) that the target region contains text. In some embodiments, the text detector additionally returns the y pixel location that is the most likely y-location of the text in the target region. In act 1809, the caption engine determines whether identified content was detected in the target region. In some embodiments, the caption engine detects identified content in the target region where the confidence exceeds a value of a threshold that is a configurable parameter. In one embodiment, the value is low (e.g., 0.001—indicating some small possibility of identified content), so that the caption engine will store the results of the act 1808 in most cases. If no identified content was detected in the target region, the caption engine executes act 1812. Otherwise, the caption engine executes act 1810. In the act 1810, the caption engine stores, in a data store (e.g., the job data storage 134 described above with reference to FIG. 1) the results generated by the act 1808 in association with an identifier of the target video frame of the media file.

In the act 1812, the caption engine determines whether unprocessed regions exist within the set of potential regions. If so, the caption engine executes the act 1806. Otherwise, the caption engine executes act 1814.

In the act 1814, the caption engine determines whether unprocessed images exist within the media file. If so, the caption engine executes the act 1804. Otherwise, the caption engine has processed all of the video frames and executes act 1816.

In some embodiments, the text detector may be replaced by, or used in conjunction with, other image processing components, such as an object detector or a face detector, that detect other identified content (e.g., visual information) that may be present in an identified region of an image. In these and other embodiments, the text detector, object detector (e.g., a detector based on an edge detection process), or facial detector (e.g., a detector based on a Viola-Jones process) need not identify the precise text, object, or face in the region, only that the text, object, or face may be present, and optionally with a given confidence value or maximum horizontal pixel location.

In other embodiments, the acts 1802-1814 are executed prior to completion of the transcription or captions for the media file, e.g. in parallel with the rest of the transcription and caption processes.

In the act 1816, the caption engine iterates to the next caption frame stored in association with images from the media file and identifies the next caption frame as a target caption frame.

In act 1818, the caption engine determines, by accessing data in the data store, whether identified content was detected within the default region of any image belonging to a series of images from video frames to be displayed during the time extent of the target caption frame. This series of images may be a series of consecutive images. For example, in the act 1818 the caption engine may determine whether the text detector detected text in the default region or the confidence$_d$ exceeds a value of a configurable parameter, threshold$_d$. The value of threshold$_d$ specifies the confidence required for the caption engine to determine that identified content exists within the default region. In some embodiments, the caption engine may adjust (e.g., decrease or increase) the value of threshold$_d$ in response to determining that the average confidence of no data in one or more candidate regions transgresses one or more configurable parameters. If the caption engine determines that identified content was detected in the default region (e.g., that the text detector detected text in the default region or the confidence$_d$ exceeds the value of threshold$_d$), the caption engine identifies the image including the default region as a target image and executes act 1820. Otherwise, the caption engine executes act 1832.

In the act 1820, the caption engine identifies a series of consecutive video frames that includes a video frame from which the target image was extracted and in which each video frame meets a set of search criteria. This search criteria may specify that each video frame be associated with a caption frame to be superimposed on the video frame and that each video frame include an image having identified content within its default region. In some embodiments, the caption engine identifies adjacent frames on each side of the video frame until text is no longer detected in the default region or until the text detection confidence is below a threshold that is a configurable parameter. In this embodiment, the caption engine searches for consecutive video frames by accessing the data store, rather than accessing video frames directly, because all of the information required to perform the search was previously stored in the data store through execution of the acts 1802-1814. The goal of the act 1820 is to determine the time extent of the identified content within the default region. The acts executed within the act 1820 are analogous to the acts executed in the act 1710 adjusted for a different source of data.

In act 1822, the caption engine determines whether the display duration of the identified content within the default region is sufficient to warrant moving caption frames from the default region. In some embodiments, the caption engine makes this determination by comparing the number of consecutive video frames identified above in the act 1820, or a period of time the consecutive video frames are displayed during playback, to a value of a display threshold that is a configurable parameter. Example values of this display threshold include 0.25 seconds or 6 frames at a 24 frames-per-second frame rate. If the display duration exceeds the value of the display threshold, the caption engine executes act 1824. Otherwise, the caption engine executes the act 1832.

In the act 1824, the caption engine determines a next region of the image that is a candidate for caption text superimposition. In some embodiments, the caption engine makes this determination by reading the next member of a set of candidate regions that are defined by a configurable parameter. This set of candidate regions may include one or more members.

In act 1826, the caption engine determines, by accessing data in the data store, whether identified content was detected in the candidate regions of a series of images from video frames to be displayed during the time extent of the target caption frame. For example, the caption engine may determine whether the text detector detected text in the candidate regions or the average confidence of text in the candidate regions exceeds a value of a configurable parameter, threshold$_c$. The value of threshold$_c$ specifies the confidence required for the caption engine to determine that identified content exists within the candidate region. In one embodiment, the value of threshold$_c$ is set to be the average confidence of text detected in the default region. If the caption engine determines that identified content was not detected in the candidate regions (e.g., that the text detector did not detect text in the candidate regions or the average confidence of the text in the candidate regions is less than a value of threshold$_c$), the caption engine executes act 1828. Otherwise, the caption engine executes act 1830.

In the act 1828, the caption engine moves the caption frame from the default regions to the candidate regions by storing position information in the caption frame that identifies the candidate regions. In some embodiments, this position information is encoded as an XY raster location within the video frames where the upper-left corner of the caption text is to be displayed. In other embodiments, the position information may be encoded as a generalized location (e.g. bottom, top, left, right, upper-right, etc.) to allow flexibility when the caption frames are converted to certain playable caption formats.

In the act 1830, the caption engine determines whether unprocessed candidate regions exist within the set of candidate regions. If so, the caption engine executes the act 1824. Otherwise, the caption engine executes the act 1832.

In the act 1832, the caption engine determines whether information descriptive of unprocessed caption frames exist within the data store. If so, the caption engine executes the act 1816. Otherwise, the caption engine has processed all of the caption frames and executes a process in accord with the acts 520 and 522 described above with reference to FIG. 5. Upon termination of the caption positioning process 1800, each of the caption frames associated with the media file includes automatically generated or verified position information.

Processes in accord with the caption positioning process 1800 enable caption systems to provide captions that are positioned to not interfere with other identified content displayed during playback of a media file, without requiring costly and time consuming manual caption placement activities. Further while the total computation required by the caption positioning process 1800 is higher than for the caption positioning process 1700 (since video frames and regions within frames will typically be processed by the caption positioning process 1800 that do not turn out to have captions in them), the turnaround time at completion of the transcription and caption creation process for the process 1800 may be faster, since the most computationally expensive acts are performed in parallel to the transcription and caption generation tasks.

In some embodiments, the caption engine is configured to read a value of a configurable parameter that indicates whether a media file is a proxy file used for distribution of the media file prior to making the media file available to the general public. When executing according to this configuration, the caption engine executes an adjusted version of the caption positioning process 1800 in which the caption engine executes the acts 1806-1810 for the default region and then proceeds directly to the act 1814 for each image. Also, in this embodiment, the caption engine proceeds from the act 1822 directly to the act 1828 where the display duration exceeds the value of the display threshold. Further, in this embodiment within the act 1828, the caption engine determines a candidate region to which to move the caption frame by reading the first member of the set of candidate regions defined by the configurable parameter described above with reference to the act 1824.

This embodiment manifests an appreciation that many proxy files have burned in time-code indicators at the top of each video frame, and would therefore be likely to have a high confidence at step 1826. By proceeding from the act 1822 directly to the act 1828, but still providing the candidate region to which to move the caption frame, the caption engine is able to function efficiently in the presence of other content (e.g., visual elements such as burned in time-code).

The caption positioning processes described above may be altered as follows. In one embodiment, the region calculation process uses a constant value for the number of lines in each caption, e.g. 2. In another embodiment, the region calculation process uses a constant value for the number of characters per line in the each line of caption text, e.g. 32. In another embodiment, the region calculation process calculates a non-rectangular search region based on the actual lengths of each line. In another embodiment, the region calculation process uses a constant value for the starting x-location (e.g., a configurable parameter that is a fraction across the width of the image) and calculates the end location of each line of caption text by adding the full line length of the line to the starting x-location, thereby causing the default region to reflect left justified caption text.

Figure 19:
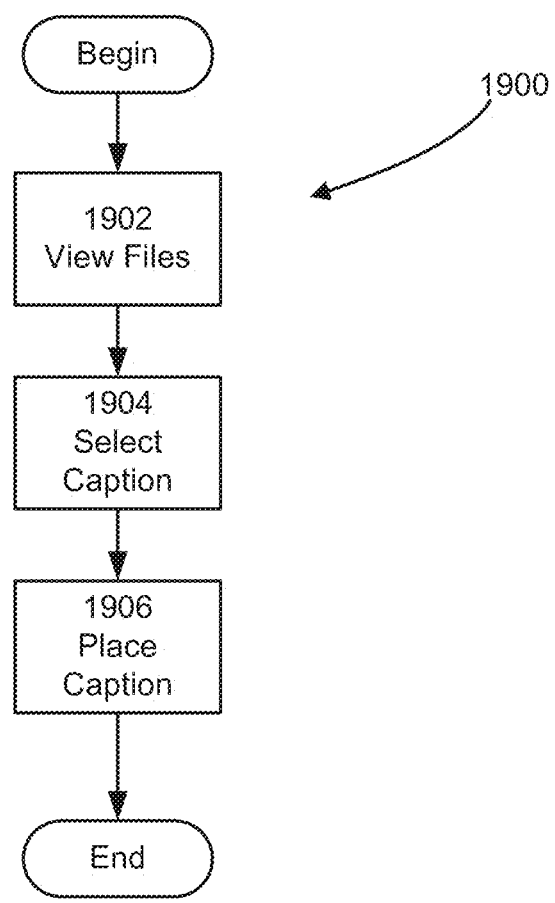
FIG. 19 is a flow diagram illustrating a user process of placing captions.

As discussed above with reference to FIG. 1, in some embodiments processes that enable an editor to place caption frames are performed using a caption system, such as the caption system 100 described above with reference to FIG. 1. An example of one of these caption placement processes is illustrated by FIG. 19. According to this example, the caption placement process 1900 includes several acts that are described further below.

Figure 20:
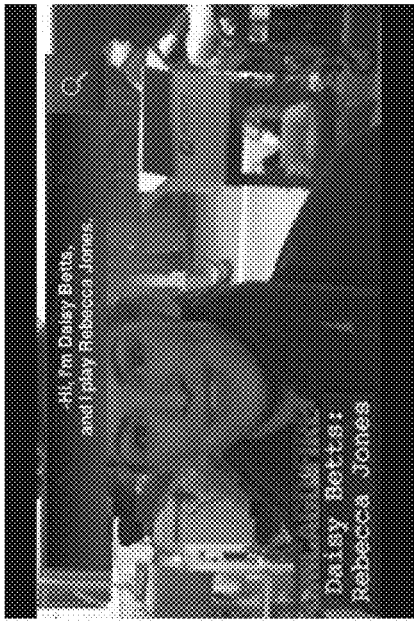
FIG. 20 is an illustration of another user interface screen provided by a caption system.

In act 1902, an editor interface, such as the editor interface 126 described above with reference to FIG. 1, presents a user interface screen that provides media file, transcription, and caption information to an editor, such as the editor 112 described above with reference to FIG. 1, via a client computer, such as the client computer 106 described above with reference to FIG. 1. FIG. 20 illustrates one example of a user interface screen presented as part of the act 1902. As shown in FIG. 20, the user interface screen includes a listing of caption frames associated with the media file, a video preview window, and several placement options that may be actuated by the editor. As illustrated in FIG. 20, caption frame 1 has been positioned at a candidate region (e.g., the top of the video frame) to avoid interfering with the "Chicago Fire" content displayed in the lower left corner of the video frame. The candidate region illustrated in FIG. 20 may be a member of sets of candidate regions that are common for any series of consecutive caption frames that includes caption frame 1.

Figure 21:
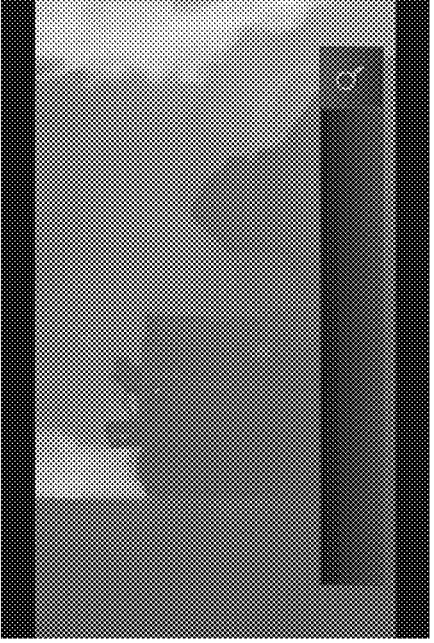
FIG. 21 is an illustration of another user interface screen provided by a caption system.

In act 1904, the editor interface receives an indication from the user interface that the editor has selected caption frame 52. In response to receiving this indication, the editor interface highlights the row corresponding to the selected caption frame. FIG. 21 illustrates one example of a user interface screen presented as part of the act 1904.

Figure 22:
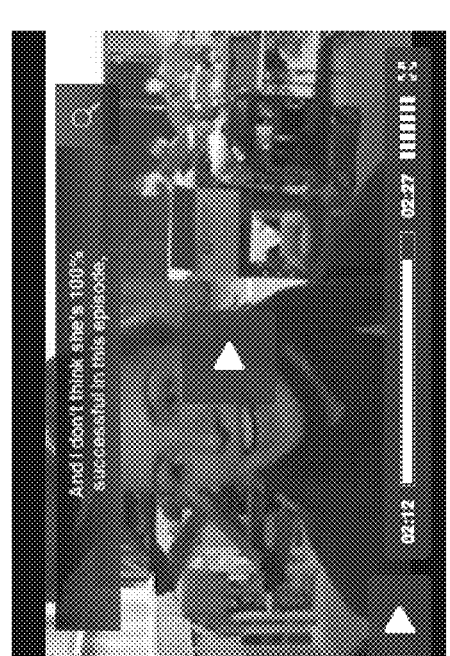
FIG. 22 is an illustration of another user interface screen provided by a caption system.
Figure 23:
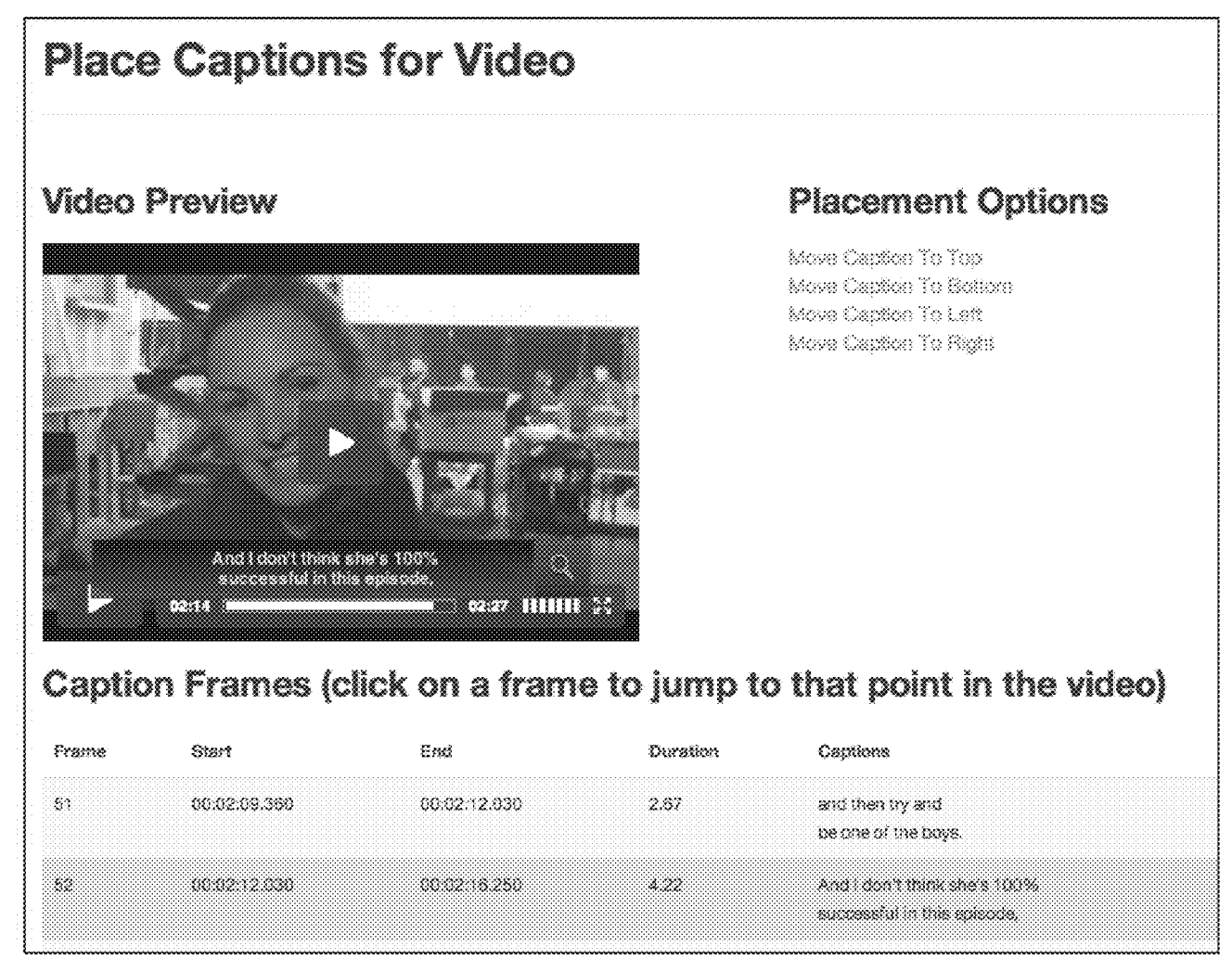

In act 1906, the editor interface receives an indication from the user interface that the editor has selected the "Move Caption to Bottom" placement option. FIG. 22 illustrates one example of a user interface screen presented as part of the act 1906. As shown in FIG. 22, the video frame associated with the caption frame selected in act 1904 is now visible in the video preview window with the caption frame 52 being positioned at the top of the video frame. In response to receiving the selection of the "Move Caption to Bottom" placement option, the editor interface changes the position information for caption frame 52 to a new location. FIG. 23 illustrates one example of a user interface screen presented as part of the act 1906. As shown in FIG. 23, the caption frame 52 is now positioned at a default region (e.g., at the bottom of the video frame). The default region illustrated in FIG. 23 may be a member of a set of default regions that are common for any series of consecutive caption frames that includes caption frame 52.

Processes in accord with the caption placement process 1900 enable human caption placement experts to place caption frames to increase comprehension of the overall content of a media file.

Processes 400 through 600, 900, and 1700 through 1900 each depict one particular sequence of acts in a particular example. The acts included in these processes may be performed by, or using, one or more computer systems specially configured as discussed herein. Some acts are optional and, as such, may be omitted in accord with one or more examples. Additionally, the order of acts can be altered, or other acts can be added, without departing from the scope of the systems and methods discussed herein. Furthermore, as discussed above, in at least one example, the acts are performed on a particular, specially configured machine, namely a caption system configured according to the examples and embodiments disclosed herein.

Alternative Embodiments

In some embodiments, a customer interface (e.g., the customer interface 124 described above with reference to FIG. 1) or an editor interface (e.g., the editor interface 126 described above with reference to FIG. 1) is configured to receive input requesting that a caption engine (e.g., the caption engine 132 described above with reference to FIG. 1) further enhance captions via analysis of audio information. In these embodiments, the interface that receives this input transmits a request to the caption engine to perform any of several audio analysis processes described below.

Further, in these embodiments, the caption engine is configured to position caption frames proximal to sources of audio information transcribed into the caption text. For example, when executing according to this configuration, the caption engine may position caption frames on the left side or the right side of the video frame, to correspond with the visual position of a speaker or speakers in an image. In the case where the source of audio information (e.g., dialogue, screams, footsteps, car crash and other noises) is depicted as being off screen, the caption engine positions caption frames including caption text transcribing the audio information on the side of the video frame where the audio information is depicted as originating. In these embodiments, the caption engine processes audio information in the media file to determine the position of caption frames.

Figure 24:
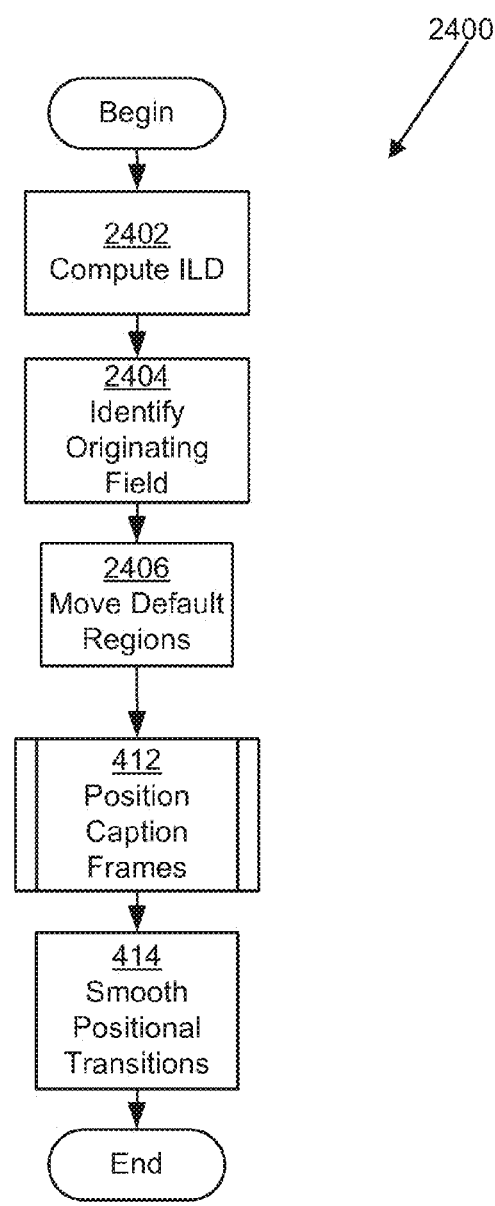
FIG. 24 is a flow diagram illustrating a process for analyzing audio to improve caption positions.

In some embodiments, the media file includes an encoded stereo audio signal. In one of these embodiments, the caption engine is configured to execute an audio analysis to determine if the media file depicts audio information as originating from the left, right, or center of the video images. FIG. 24 illustrates one example of such an audio analysis process 2400. In act 2402, the caption engine computes the average inter-channel level difference (ILD) within finite-duration windows (such as 100 ms) of stable measurements and averages the resulting ILDs over time segments of interest, such periods of time over which caption text from one or more caption frames is to be displayed.

In act 2404, the caption engine determines whether the magnitude of the average ILD exceeds a value, such as 6 dB, of a threshold for a particular originating field (left, right, or center, for the case where the ILD does not exceed the value of the threshold). This threshold may be a configurable parameter. In some embodiments, the caption engine adjusts the value of the threshold according to the distribution of ILDs present in the media. For example, the caption engine may collect the ratio of the left-channel/right-channel ILDs across the entire media file and use the $25^{th}$ percentile value as a value of a threshold to identify the right channels as being predominant (i.e. if the ratio is lower than the $25^{th}$ percentile value) and the $75^{th}$ percentile value as a value of a threshold to identify the left channel as being predominant (i.e. if the ratio is greater than the $75^{th}$ percentile value). If the average ILD transgresses the value of the threshold for one originating field, the caption engine determines that the audio originates from that originating field and moves the default regions for images to be displayed in the time segments of interest to the originating field in act 2406. In one embodiment, where the originating field is left or right, the caption engine moves the default region to 0.1 of the width of the video frame away from the left or right edge of the frame. In other embodiments, the originating field may be located at any point on the video frame and may be used to represent audio sources on or off video frame.

Next, the caption engine executes the acts 412 and 414 described above with reference to FIG. 4 and terminates the audio analysis process 2400. Processes in accord with the process 2400 further enhance communication of media content through more accurately positioned captions.

Figure 25:
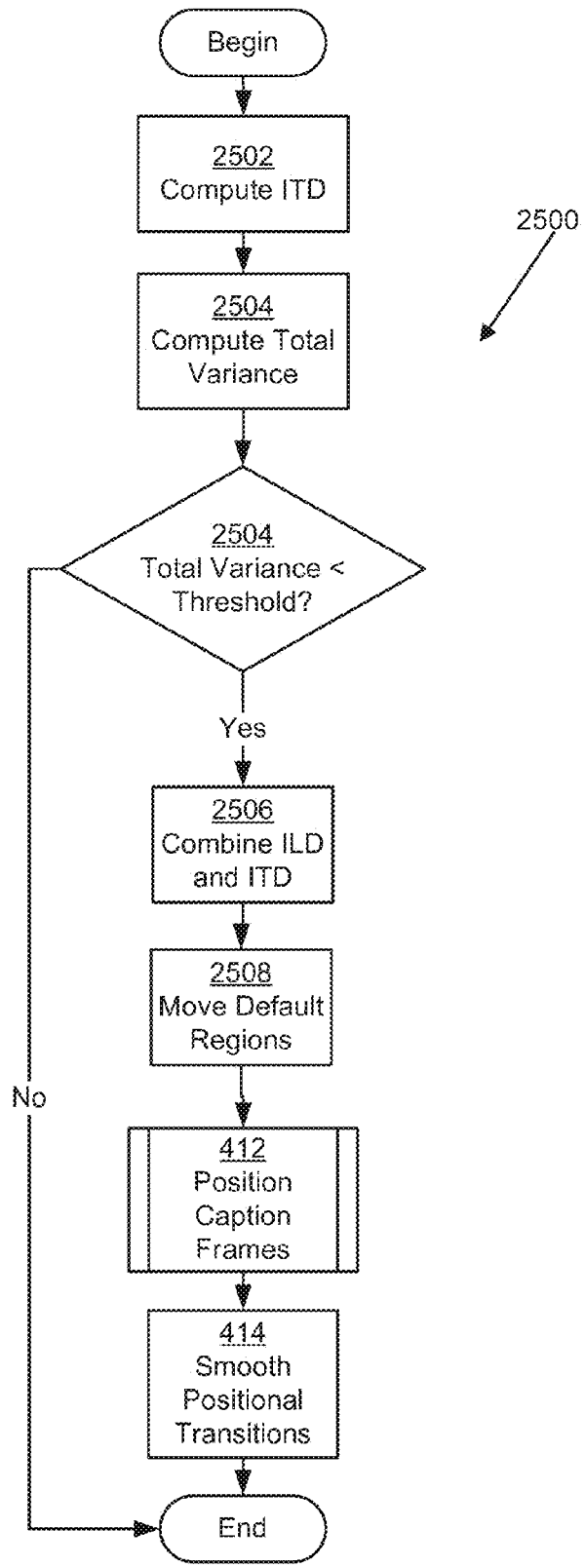
FIG. 25 is a flow diagram illustrating a process for analyzing audio to improve caption positions.

In another embodiment, the caption engine is configured to execute an audio analysis of the inter-channel time difference (ITD) to determine the location of sounds. FIG. 25 illustrates one example of such an audio analysis process 2500. In act 2502, the caption engine computes the ITD by calculating a cross-correlation coefficient between the left-channel and right-channel waveforms using similar time windows as for the ILD analysis and using values for thresholds such as +/−300 μs (microseconds). These thresholds may be configurable parameters. In act 2504, the caption engine uses the total variance of ITD across the time windows to automatically determine if ITD is a reliable cue for this media file, as not all stereo recordings will contain meaningful ITDs. For example, where the caption engine determines that the total variance in the ITD computed over 100 ms windows is less than a value, such as 100 μs, of a threshold that is a configurable parameter, the caption engine determines that ITDs in the media file are not deliberately encoded and terminates the audio analysis process 2500. In act 2506, the caption engine combines ILD and ITD by mapping both to a comparable scale. For example, the caption engine may map ILDs from −10 dB to +10 dB to −1 and +1, respectively, using a hard-limiting or compressive sigmoid function. Similarly, the caption engine may map ITDs between −600 μs and +600 μs to −1 and +1, respectively. In some embodiments, the caption engine linearly combines the resulting scaled ILD and ITD to obtain a single measure between −1, representing the left originating field, and 1, representing the right originating field. In some embodiments, the caption engine uses threshold values such as −0.3 and +0.3 to divide this space into left, center, and right originating fields. In other embodiments, a non-linear combination can be used, such as by selecting the cue with the largest magnitude to determine the originating field. In act 2508, the caption engine moves the default regions for images to be displayed in the time segments of interest to the originating field as indicated by the value of the combination.

Next, the caption engine executes the acts 412 and 414 described above with reference to FIG. 4 and terminates the audio analysis process 2500. Processes in accord with the process 2500 further enhance communication of media content through more accurately positioned captions.

Figure 26:
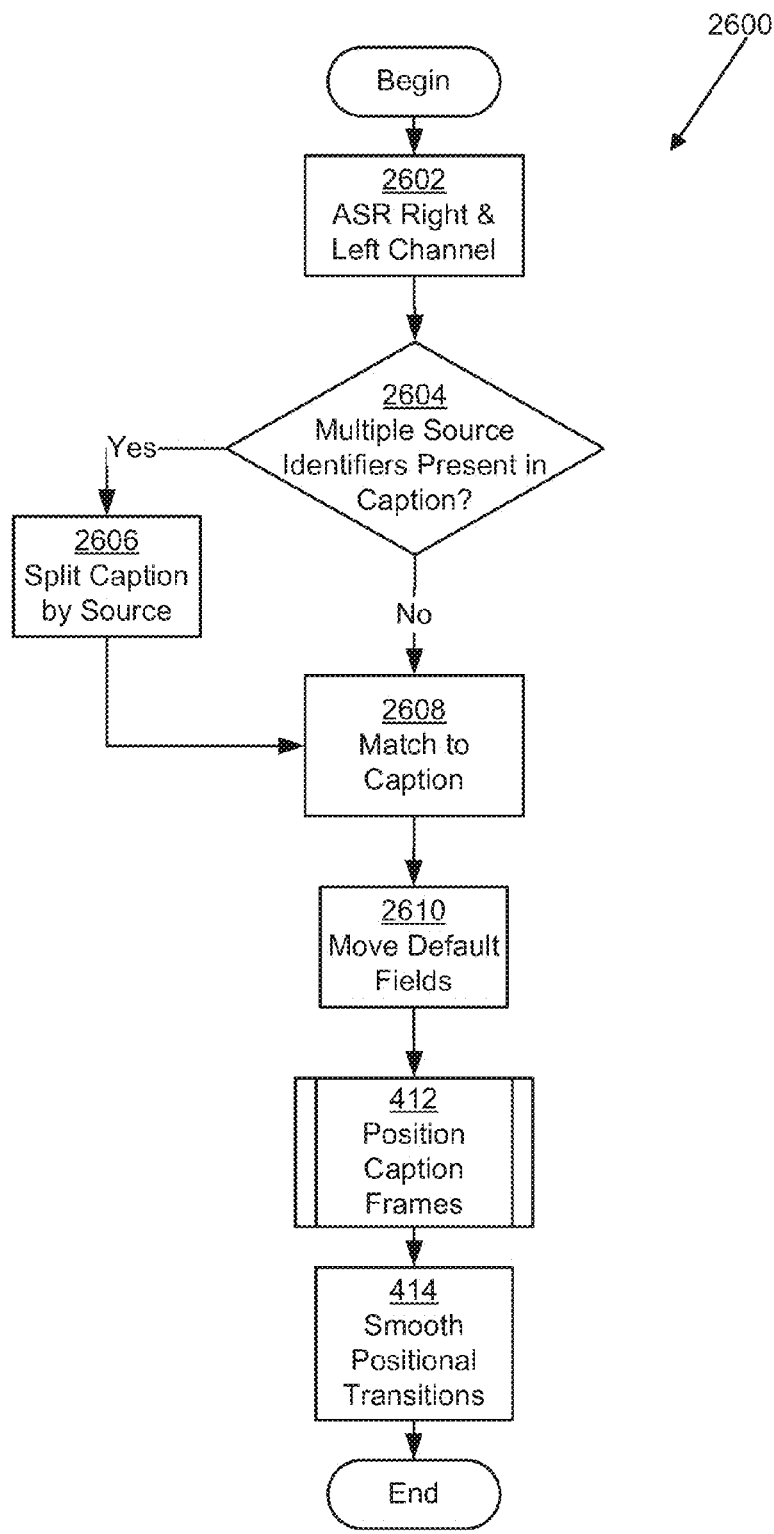
FIG. 26 is a flow diagram illustrating a process for analyzing audio to improve caption positions.

In another embodiment, the caption engine is configured to analyze a stereo audio signal with automatic speech recognition (ASR) techniques and compare the resulting text to the caption text in the caption frame to ensure that there is correspondence between each channel's audio and the relevant text. FIG. 26 illustrates one example of such an audio analysis process 2600. In act 2602, the caption engine executes ASR processing (e.g., via the system interface 128 and the ASR device 122 described above with reference to FIG. 1) on the left channel separately from the right channel. In act 2064, the caption engine determines whether the caption text includes identifiers of the source of a captioned sound. For example, the caption engine may determine whether multiple speaker tags are present in a given caption frame (for example TEACHER: and STUDENT:). If the caption engine determines that the caption text includes multiple source identifiers, the caption engine executes act 2606. Otherwise, the caption engine executes the act 2608.

In the act 2606, the caption engine splits the caption frame into a multiple caption frames, with each caption frame of the multiple caption frames corresponding to a source identifier (e.g., a speaker tag) of the multiple source identifiers. In the act 2608, the caption engine compares the respective ASR right-channel text output and ASR left-channel text output with the corresponding (over time segments of interest) caption text from the corresponding caption frame. In one embodiment, the caption engine performs this comparison by executing a matching component implementing a string-matching process such as the Levenshtein process. Next, in the act 2608, the caption engine matches each channel with its corresponding caption frame, i.e., the caption frame which has the lowest word error rate for the ASR channel output according to the matching component and identifies the matching channel as being the originating field for its corresponding caption frame. In act 2610, the caption engine moves the default regions for images to be displayed in the time segments of interest to the originating field(s). It is appreciated that the ASR processing used for this embodiment may be constrained by an open-ended language model or by a model that is biased to the relevant text.

Next, the caption engine executes the acts 412 and 414 described above with reference to FIG. 4 and terminates the audio analysis process 2600. Processes in accord with the process 2600 further enhance communication of media content through more accurately positioned captions.

Figure 27:
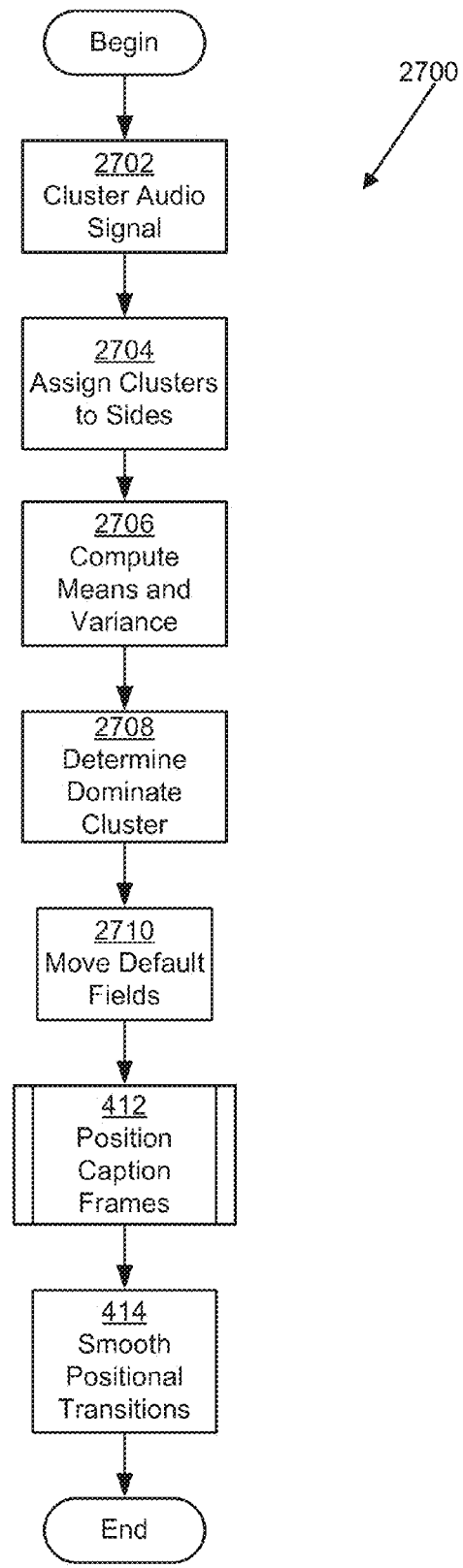
FIG. 27 is a flow diagram illustrating a process for analyzing audio to improve caption positions.

In another embodiment, the caption engine is configured to analyze a single-channel audio signal contained in the media file, optionally in conjunction with caption text, to determine if multiple speakers are present in the audio. FIG. 27 illustrates one example of such an audio analysis process 2700. When executing according to the configuration of this embodiment, in act 2702 the caption engine clusters the relevant portion of the audio signal (e.g. the portion corresponding to time segments of interest) into acoustic clusters, by executing a clustering component based on, for example, the cepstral vector k-means process used in speaker clustering or ASR. The caption engine may set the number of clusters to correspond to a predetermined number of speakers speaking during the caption frame. This predetermined number may be determined by the caption engine from previously stored information descriptive of the number of speakers or from analysis of the transcription or caption text for indicators such as speaker tags. The caption engine may add additional clusters to account for noises or other non-speech audio for which side-positioning the caption text may be desired, again based on prior configuration or analysis of the transcription or caption text for the media file.

In act 2704, the caption engine assigns to each cluster to an originating field of the video frame. For example, the caption engine may alternate between assigning the left side and the right side for each cluster, as its identifier (e.g. a speaker tag or noise indicator) appears in the transcript for the media file. If a speaker tag or noise indicator appears multiple times in the transcript, the caption engine may assign either one side per cluster identifier (so that caption text associated with a given acoustic cluster always appears on the same side of the video frame), or alternative sides for every identifier occurrence (so that the side on which the caption text appears always changes as the acoustic cluster changes in time).

In act 2706, the caption engine next computes the means and variance for the acoustic clusters over the entire audio signal for the media file. In act 2708, for each caption frame, the caption engine analyzes the corresponding audio signal to determine which cluster is dominant (i.e. which acoustic cluster is closest, in the k-means sense) during the time extent of the caption frame. The caption engine may determine the closest cluster based on a process which counts the acoustic frames across the duration of the caption frame, giving a vote to each cluster which is closest at each frame, and then choosing the cluster which has the most votes. Alternatively, the caption engine may determine the closest cluster based on the total k-means distance for each cluster across the duration of the caption frame. That is, for each acoustic frame across the caption frame duration, the caption engine computes the k-means distance for each of the acoustic clusters, and sums this distance across the caption frame duration. The caption engine then chooses the cluster with the lowest total distance as being the dominant cluster in the caption frame. In act 2710, the caption engine moves the default regions for images to be displayed in the time segments of interest to the originating field of the dominant cluster.

Next, the caption engine executes the acts 412 and 414 described above with reference to FIG. 4 and terminates the audio analysis process 2700. Processes in accord with the process 2700 further enhance communication of media content through more accurately positioned captions.

According to various embodiments, the caption engine is configured to use side positioning embodiments, such as those described above, conditionally, based on whether the caption text contains multiple speaker tags, whether the caption text indicates sound effects, or whether the caption text includes indicators that sounds are depicted as taking place off screen. For example the caption text may be:
TEACHER: So, do you understand?
STUDENT: Yes.
Or
POLICEMAN (OFFSCREEN): Halt, or I'll shoot.
Or
[CRASHING SOUNDS OFFSCREEN]

By searching the caption frames text for patterns such as these, for example using regular expression pattern matching techniques, the caption engine may determine during which time periods (i.e. the time extent of the corresponding caption frames) the above audio analyses are used in order to position the caption frames on a side of the video frame.

In another embodiment, all configurable parameters disclosed herein can be set to apply to an individual media files, all of an identified customer's media files, or a subset of the identified customer's media files (e.g. according to project_id).

In another embodiment, the caption engine is configured to, after execution of the act 414, determine a percentage of caption frames repositioned. Next, when executing according to this configuration, the caption engine compares this percentage a threshold which is a configurable parameter. Where the caption engine determines that the percentage is above the threshold, the caption engine adds an indicator to the media file (e.g. a field in the media file table 202 described above with reference to FIG. 2) to identify the media file as possibly containing non-native-language content (since such content is often subtitled). Further, in this embodiment, a customer interface (e.g., the customer interface 124 described above with reference to FIG. 1) is configured to notify the user of the existence of the indicator. This can be beneficial to the general transcription workflow, since such files may be excluded from the system prior to editing jobs being created, or editing expense being incurred.

In another embodiment, the customer interface is configured to receive input that specifies reconfigured values for configurable positioning parameters (e.g. default region, desired candidate regions, the continuity parameter MAXIMUM_SEARCH, the confidence thresholds, and the display threshold, textual relation unit used to group caption frames—phrase, sentence, or paragraph). In this embodiment, the customer interface is also configured to receive input requesting that acts 412 and 414 be executed independently of the other acts within a caption generation process 400 described above with reference to FIG. 4. Further, the input requesting execution of the acts 412 and 414 may specify that the acts 412 and 414 may be execute either with caption frame positions as currently encoded (which may, of course, have been modified from the default position in the initial run of the repositioning algorithm), or with the default positions restored as per the customer configuration.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

Pseudo-Code Listing

```
# Find cases where we have top_bottom_top, and bottom is less than
# JUMPING_AROUND_DURATION, and move them to the top.
# Also, if a sentence is broken up, we recombine, conditioned on
# ALLOW_BROKEN_SENTENCES
JUMPING_AROUND_DURATION=3.0;
ALLOW_BROKEN_SENTENCE=False;
def smooth_caption_moves(Array @caption_frames):
    # the total bottom duration so far:
    bottom_dur=0.0;
    # Are we currently positioned at the top?:
    at_top=false;
    # Are we currently in the middle of a sentence?:
    in_sentence=false;
    # Keep track of all caption frames that are in the in the current sentence:
    sentence_frames=[ ];
    # Keep track of frames we may want to move to top based on duration:
    duration_frames=[ ];
    for each frame (@caption_frames) {
    this_top=frame.at_top?;
    this_dur=frame.duration;
    if (at_top && !this_top) {
        # we are currently at top, but this frame is at bottom
        if (in_sentence) {
            # Move this frame to top, since we are in the middle
              of a sentence:
            frame.move_to_top;
        }
        else {
            # New sentence, so
              # reset bottom duration:
            bottom_dur=this_dur;
            # restart duration_frames:
            duration_frames=[frame];
            # we are NOT at the top:
            at_top=false;
        }
    }
    elsif (!at_top) {
      if (this_top) {
        # we are currently at bottom, but this frame is at the
           top:
        if (bottom_dur<JUMPING_AROUND_ DURATION) {
            # Bottom duration is too short, so
            # move these bottom frames to the top:
              duration_frames.each {|f| f.move_to_top;}
        }
        if (in_sentence && (sentence_frames.length>0))
            # Also, move any other frames in this sentence to
               the top:
            sentence_frames.each {|f| f.move_to_top;}
            sentence_frames=[ ];
        end
        at_top=true;
        bottom_dur=0.0;
        duration_frames=[ ];
      } # End of this_top branch
      else {
        # staying on bottom
           # Increment the variables:
        bottom_dur+=this_dur;
        duration_frames<<frame;
      }
    } # Note that top→top condition is not considered.
    # Here is where we collect the sentence_frames (done at
       every frame):
    unless (allow_broken_sentences) {
      if (frame.end_sentence?) {
        in_sentence=false;
        sentence_frames=[ ];
      }
      else {
        in_sentence=true;
        sentence_frames<<frame;
      }
    } # End of sentence_frame bookkeeping
    } # End of loop over @caption_frames
} # End of method smooth_caption_moves
```

What is claimed is:

1. A system for positioning captions upon video images of a media file, the system comprising:
   a memory storing at least one caption frame associated with at least one video frame;
   at least one processor in data communication with the memory; and
   a caption engine component executable by the at least one processor and configured to:
      calculate dimensions of at least one region of the at least one video frame based on caption text included in the at least one caption frame;
      determine that the at least one region of the at least one video frame is free of identified content at least in part by executing a text detector component configured to limit text searching to the at least one region; and
      position the at least one caption frame within the at least one region.

2. The system of claim 1, wherein the caption engine component is further configured to generate caption information including a caption based on the at least one caption frame.

3. The system of claim 1, wherein the identified content includes text present in the video frame.

4. The system of claim 1, wherein the caption engine component is further configured to determine that a default region of the at least one video frame includes identified content.

5. The system of claim 4, wherein the caption engine component is further configured to identify a series of consecutive video frames as including:
   the at least one video frame; and
   one or more video frames including identified content within one or more default regions.

6. The system of claim 5, wherein the caption engine component is further configured to:
   calculate a duration of the series;
   determine that the duration exceeds a threshold value; and
   position, in response to determining that the duration exceeds the threshold value, one or more caption frames within one or more candidate regions of one or more video frames included in the series, the one or more candidate regions including the at least one region, the one or more caption frames including the at least one caption frame.

7. The system of claim 6, wherein the caption engine component is further configured to smooth positional transitions between caption frames within a series of consecutive caption frames at least in part by positioning additional caption frames within a region common to the series.

8. The system of claim 6, wherein the caption engine component is further configured to smooth positional transitions between caption frames within a series of consecutive caption frames at least in part by positioning a plurality of caption frames belonging to a textual unit within a region common to the series.

9. The system of claim 6, wherein the caption engine component is further configured to:
   calculate a percentage of all caption frames associated with the media file that are within the one or more caption frames;
   compare the percentage to a threshold value; and
   store an indication that the media file may be a foreign language media file.

10. The system of claim 1, wherein the caption engine component is configured to determine that the at least one region of the at least one video frame is free of identified content by determining that a confidence value that a default region contains text is greater than a confidence value that the at least one region contains text.

11. The system of claim 1, further comprising a user interface component executable by the at least one processor and configured to:
    receive input to place the at least one caption frame at a new location; and
    position, responsive to receiving the input, the at least one caption at the new location.

12. The system of claim 1, wherein the caption engine component is further configured to:
    analyze audio information associated with the media file to generate an analysis result;
    determine at least one originating field relative to the video frame based on the analysis result; and
    move the at least one region to the at least one originating field.

13. The system of claim 12, wherein the analysis result is at least one of an inter-channel level difference, an inter-channel time difference, an automatic speech recognition right-channel text output, an automatic speech recognition left-channel text output, and means and variance of audio clusters.

14. The system of claim 12, wherein the caption engine component is further configured to:
    identify a plurality of source identifiers within the caption text of the at least one caption frame; and
    split the at least one caption frame into a plurality of caption frames respectively corresponding to the plurality of source identifiers.

15. A method for positioning captions upon video images of a media file, the method comprising:
    calculating dimensions of at least one region of at least one video frame based on caption text included in at least one caption frame;
    determining that the at least one region of the at least one video frame is free of identified content at least in part by executing a text detector component configured to limit text searching to the at least one region; and
    positioning the at least one caption frame within the at least one region.

16. The method of claim 15, further comprising generating caption information including a caption based on the at least one caption frame.

17. A non-transitory computer readable medium storing sequences of computer executable instructions for positioning captions upon video images of a media file, the sequences of computer executable instructions including instructions configured to instruct at least one processor to:
    calculate dimensions of at least one region of at least one video frame based on caption text included in at least one caption frame;
    determine that at the least one region of the at least one video frame is free of identified content at least in part by executing a text detector component configured to limit text searching to the at least one region; and
    position the at least one caption frame within the at least one region.

18. The non-transitory computer readable medium of claim 17, wherein the instructions are further configured to instruct the at least processor to generate caption information including a caption based on the at least one caption frame.

19. The non-transitory computer readable medium of claim 17, wherein the instructions are further configured to instruct the at least processor to determine that a default region of the at least one video frame includes identified content.

20. The method of claim 15, further comprising determining that a default region of the at least one video frame includes identified content.

* * * * *